(12) United States Patent
Cobb, Jr. et al.

(10) Patent No.: US 6,515,785 B1
(45) Date of Patent: Feb. 4, 2003

(54) OPTICAL DEVICES USING REFLECTING POLARIZING MATERIALS

(75) Inventors: Sanford Cobb, Jr., St. Marys Point, MN (US); David L. Wortman, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/298,003

(22) Filed: Apr. 22, 1999

(51) Int. Cl.[7] .............................. G02F 1/01; G02B 5/30; G02B 6/00; F21V 9/14

(52) U.S. Cl. .................. 359/247; 359/256; 359/487; 359/495; 359/500; 359/599; 385/146; 385/901; 362/31; 362/558; 362/559; 362/561; 349/62; 349/64; 349/96

(58) Field of Search .......................... 359/247, 256, 359/487, 495, 500, 599; 385/36, 146, 901; 349/62, 64, 96; 362/19, 31, 558, 559, 561

(56) References Cited

U.S. PATENT DOCUMENTS

| | | |
|---|---|---|
| 3,124,639 A | 3/1964 | Kahn |
| 3,610,729 A | 10/1971 | Rogers |
| 3,653,138 A | 4/1972 | Cooper ........................ 40/132 |
| 3,711,176 A | 1/1973 | Alfrey, Jr. et al. |
| 3,860,036 A | 1/1975 | Newman, Jr. |
| 4,446,305 A | 5/1984 | Rogers et al. |
| 4,520,189 A | 5/1985 | Rogers et al. |
| 4,521,588 A | 6/1985 | Rogers et al. |
| 4,525,413 A | 6/1985 | Rogers et al. |
| 4,720,426 A | 1/1988 | Englert et al. |
| 5,188,760 A | 2/1993 | Hikmet et al. |
| 5,211,878 A | 5/1993 | Reiffenrath et al. |
| 5,235,443 A | 8/1993 | Barnik et al. |
| 5,269,995 A | 12/1993 | Ramanathan et al. |
| 5,294,657 A | 3/1994 | Melendy et al. |

(List continued on next page.)

FOREIGN PATENT DOCUMENTS

| | | | |
|---|---|---|---|
| EP | 597261 | 5/1994 | ......... G02F/1/1335 |
| EP | 802 446 | 10/1997 | ......... G02F/1/1335 |
| EP | 0 606 940 B1 | 4/1999 | |
| WO | WO 95/17303 | 6/1995 | |
| WO | WO 95/17691 | 6/1995 | |
| WO | WO 95/17692 | 6/1995 | |
| WO | WO 95/17699 | 6/1995 | |
| WO | WO 95/27919 | 10/1995 | |
| WO | WO 96/19347 | 6/1996 | |
| WO | WO 97/01440 | 1/1997 | |
| WO | WO 97/01774 | 1/1997 | |
| WO | WO 97/32223 | 9/1997 | |
| WO | WO 97/32224 | 9/1997 | |
| WO | WO 97/32225 | 9/1997 | |
| WO | WO 97/32226 | * 9/1997 | ................. 359/500 |
| WO | WO 97/32227 | 9/1997 | |
| WO | WO 97/32230 | 9/1997 | |

OTHER PUBLICATIONS

Schrenk, W. et al., "Nanolayer polymeric optical films", *Tappi Journal*, pp. 169–174 (Jun. 1992).

Primary Examiner—Ricky D. Shafer
(74) Attorney, Agent, or Firm—Merchant & Gould P.C.

(57) ABSTRACT

Optical devices using reflective polarizers and, in particular, diffusely reflective polarizers are provided. Many of the optical devices utilize the diffusely reflecting and specularly transmitting properties of diffusely reflecting polarizers to enhance their optical characteristics. The optical devices include a lighting system which uses a reflector formed from a diffusely reflecting polarizer attached to a specular reflector. Another optical device is a display apparatus which uses a diffusely reflecting polarizer layer in combination with a turning lens which folds shallow angle light toward a light modulating layer. Other optical devices exploit the depolarizing characteristics of a diffusely reflecting polaizer when reflecting light. Still other optical devices use diffusely reflecting polarizers to recycle light and improve display illumination.

4 Claims, 26 Drawing Sheets

U.S. PATENT DOCUMENTS

| | | |
|---|---|---|
| 5,316,703 A | 5/1994 | Schrenk |
| 5,319,478 A | 6/1994 | Fünfschilling et al. |
| 5,325,218 A | 6/1994 | Willett et al. |
| 5,389,324 A | 2/1995 | Lewis et al. |
| 5,422,756 A * | 6/1995 | Weber ................... 359/487 |
| 5,448,404 A | 9/1995 | Schrenk et al. |
| 5,486,935 A | 1/1996 | Kalmanash |
| 5,486,949 A | 1/1996 | Schrenk et al. |
| 5,528,720 A * | 6/1996 | Winston et al. ............ 385/131 |
| 5,587,816 A * | 12/1996 | Gunjima et al. ............ 349/62 |
| 5,612,820 A | 3/1997 | Schrenk et al. |
| 5,629,055 A | 5/1997 | Revol et al. |
| 5,686,979 A | 11/1997 | Weber et al. |
| 5,699,188 A | 12/1997 | Gilbert et al. |
| 5,712,694 A * | 1/1998 | Taira et al. ................. 349/62 |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,828,488 A * | 10/1998 | Ouderkirk et al. .......... 359/497 |
| 5,867,316 A | 2/1999 | Carlson et al. ............ 359/500 |
| 5,882,774 A | 3/1999 | Jonza et al. |
| 5,940,149 A | 8/1999 | Vanderwerf |
| 5,962,114 A | 10/1999 | Jonza et al. |
| 5,965,247 A | 10/1999 | Jonza et al. |
| 5,976,686 A * | 11/1999 | Kaytor et al. ............... 359/599 |
| 6,011,602 A * | 1/2000 | Miyashita et al. ............ 359/65 |
| 6,025,897 A * | 2/2000 | Weber et al. ................. 349/62 |
| 6,104,454 A * | 8/2000 | Hiyama et al. ............... 349/96 |
| 6,111,696 A * | 8/2000 | Allen et al. ................. 359/495 |

* cited by examiner

OPTICAL DEVICES USING REFLECTING POLARIZING MATERIALS

FIELD OF THE INVENTION

The present invention generally relates to optical devices using reflective polarizers and, more particularly, to optical devices using diffusely reflecting polarizing materials.

BACKGROUND OF THE INVENTION

Reflecting polarizers generally include materials which transmit light of a first polarization and which reflect light of a second, different polarization. Reflecting polarizers include, by way of example and not of limitation, diffusely reflecting polarizers, multilayer reflective polarizers, and cholesteric reflective polarizers. Examples of diffusely reflecting polarizing materials includes those disclosed U.S. Pat. Nos. 5,783,120 and 5,825,543 and in PCT Patent Application Publication Nos. WO 97/32223, WO 97/32224, WO 97/32225, WO 97/32226, WO 97/32227, and WO 97/32230, the contents of all of which are incorporated herein by reference. Examples of multilayer reflective polarizers are described in U.S. Pat. No. 5,882,774, the contents of which are incorporated herein by reference. Examples of cholesteric reflective polarizers are described in EP 606 940 and U.S. Pat. No. 5,325,218, the contents of both of which are incorporated herein by reference.

SUMMARY OF THE INVENTION

The present invention provides optical devices using reflecting polarizers, such as diffusely reflecting polarizers. In one embodiment, a display apparatus is provided. The display apparatus includes a light modulating layer having first surface and a light cavity for providing light to the light modulating layer. A light guide is disposed to receive light from the light cavity and output light at a low angle relative to the first surface of the light modulating layer. A turning lens is disposed to receive the low angle light output from the light guide and redirect light towards the light modulating layer. The display apparatus further includes a diffusely reflecting polarizer disposed between the turning lens and the light modulating layer for receiving the redirected light and transmitting a component of the redirected light having a first polarization toward the light modulating layer and diffusely reflecting a component of the redirected light having a second polarization different than the first polarization.

A lighting system, according to an embodiment, includes a light source for providing light and a reflector which includes a diffusely reflecting polarizer disposed closer to the light source and a specular reflector attached to the diffusely reflecting polarizer and disposed further from the light source. In use, a component of the light having a first polarization is transmitted by the diffusely reflecting polarizer, specularly reflected by the specular reflector, and specularly retransmitted through the diffusely reflecting polarizer to provide specularly reflected light of the first polarization having a first distribution. A second component of the light which has a second, different polarization is diffusely reflected by the diffusely reflecting polarizer (without reaching the specular reflector) to provide diffusely reflected light having a second distribution different from the first distribution. The diffused light may be used as general ambient light while the specularly reflected light of the first polarization may be used as task lighting, for example.

A display apparatus, in accordance with another embodiment, includes a light modulating layer and a light cavity adapted to provide light to a light modulating layer. The apparatus further includes a diffusely reflecting polarizer, disposed between the light modulating layer and the light cavity, for transmitting a component of the light provided by the light cavity having a first polarization for viewing and diffusely reflecting a component of the light received from the light cavity having a second polarization. The light cavity typically reflects incident light, e.g., light diffusely reflected by the polarizer, with a first degree of depolarization. The polarizer diffusely reflects the light with a second degree of depolarization greater than the first degree of depolarization to provide light of the first depolarization. Due to the depolarization, at least a portion of the diffusely reflected light of the first polarization is reflected by the light cavity without polarization toward the diffusely reflecting polarizer for transmission therethrough.

In another embodiment, a display apparatus is provided which includes a light cavity for providing light and a diffusely reflecting polarizer disposed to receive the light. The diffusely reflecting polarizer diffusely reflects light of a second polarization toward the light cavity and transmits light of a first polarization. The diffusely reflective polarizer has a selected dispersed phase concentration which provides a desired gain distribution.

A display apparatus, in another embodiment, includes a emissive element for providing light and a contrasting enhancing filter disposed on the viewing side of the emissive element. The contrast enhancing filter includes an absorbing polarizer and a reflecting polarizer disposed closer to the emissive element than the absorbing polarizer. The contrast enhancing filter may, for example, further include one or more tint layers above and/or below the diffusely reflecting polarizer. The reflecting polarizer may, for example, be a diffusely reflecting polarizer.

The above summary of the invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
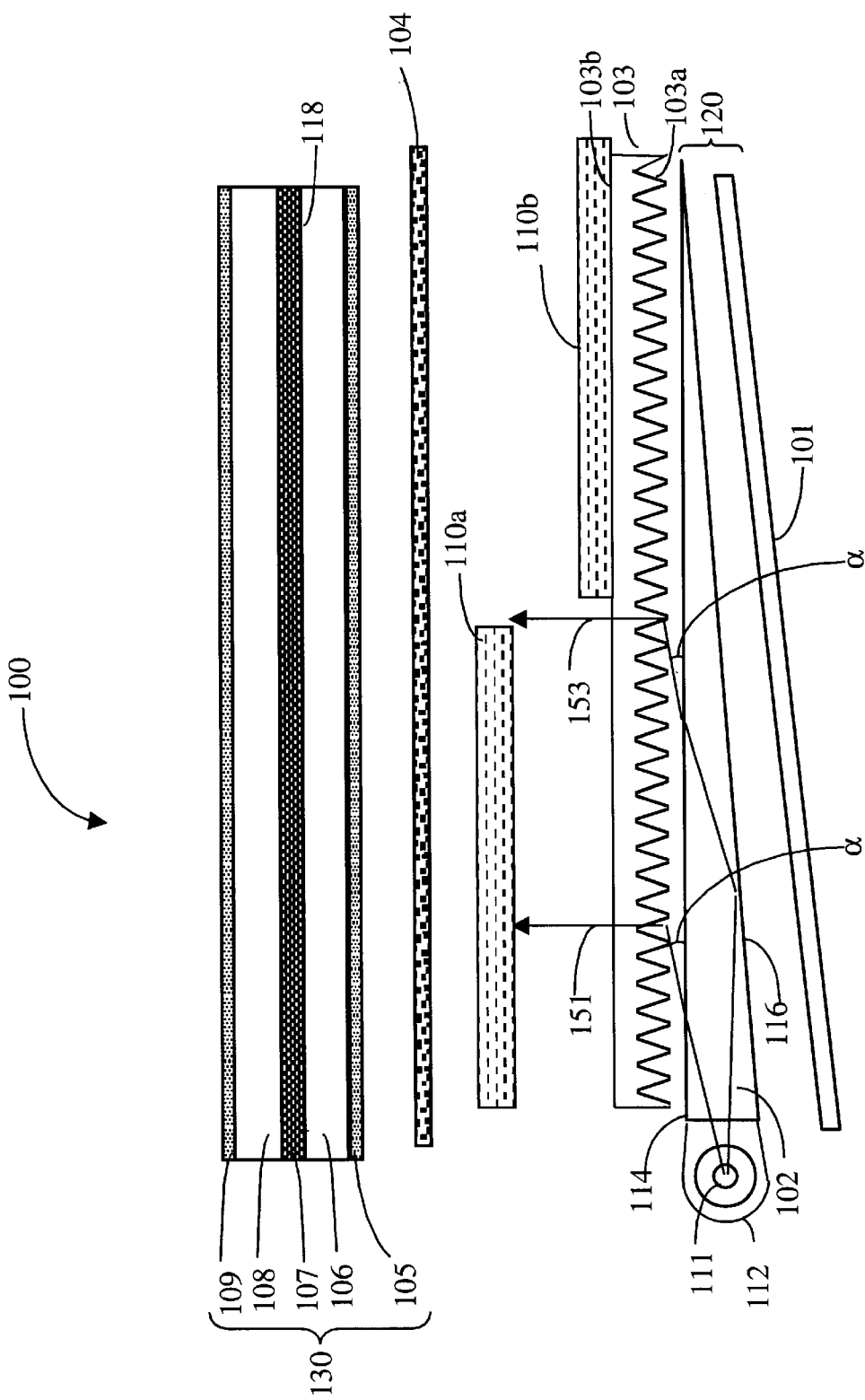
FIG. 1A illustrates an exemplary display apparatus in accordance with an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a number of different optical devices using reflecting polarizers. Aspects of the invention are particular suited to the use of diffusely reflecting polarizers. While the present invention is not so limited, an appreciation of various aspects of the invention will be gained through a discussion of the examples provided below.

Diffusely reflecting polarizers (DRPs) typically specularly transmit a component of incident light of a first polarization and diffusely reflect a component of the light having a second polarization. The terms specular and diffuse are relative terms which can vary depending on the context of the application. As used herein, specularly transmitted light generally refers to light transmitted without substantial deviation from its incident path. The term diffusely reflected light generally refers to light reflected with considerable diffusion. By way of example and not of limitation, specularly transmitted light may refer to light deviated from its incident path by about 8 degrees or less, while diffusely reflected light may refer to light deviated by about 8 degrees or more from a reflection angle equal to an incident angle of the light.

Many of the examples illustrate display apparatus or other optical devices which include light sources, light guides and/or light cavities. The term light source will be used herein to refer to a source of light, such as a light bulb. The terms optical cavity and light cavity will be used interchangeably herein to refer to a cavity which provides light. Such a cavity may include one or more of the following elements: a light source, a light guide or other transparent medium, and one or more specular or diffuse reflectors.

FIG. 1A illustrates a display apparatus using a diffusely reflecting polarizer according to one embodiment. The exemplary display apparatus 100 includes a light modulating system 130 and an optical cavity 120 for providing light to the light modulating system 130 and illuminating the display apparatus 100. In this embodiment, the light modulating system 130 includes a first polarizer 105, a first transparent substrate 106, a light modulating layer 107, a second transparent substrate 108, and a second polarizer 109. The example display apparatus 100 may, for example, be a liquid crystal display (LCD) having liquid crystal light modulating layer 107. First polarizer 105 is typically a dichroic polarizer which transmits light of a desired polarization and absorbs light of an undesired polarization. The optical cavity 120 typically includes a light source 111 and a light guide 102 for receiving light from the light source 111. The light source 111 may, for example, be a linear light source, such as a cold cathode fluorescent tube, or CCFT. The light guide 102 may, for example, be made of a transparent plastic material such as polymethylmethacrylate (PMMA). Light guide 102 is typically wedge shaped, as shown in FIG. 1A, but other shapes may be used.

In operation, light from light source 111 is directed, with the aid of reflector 112, into light guide 102. Most rays of light traveling through light guide 102 impinge upon surfaces 114 and 116 at angles greater than the critical angle, and are therefore totally reflected by total internal reflection (TIR). In order to extract light from light guide 102, small surface irregularities or local angular changes may be incorporated into surface 114, to frustrate some of the total internal reflection, a phenomenon called frustrated total internal reflection (FTIR). Since guide 102 is typically relatively thin, light can only travel through it in a narrow range of directions. As a result, light (e.g., rays 151 and 153) leaving guide 102 tends to leave at relatively low angles a relative to the surface 118 of the light modulating layer 107. The angle α is typically less than 20 degrees in many applications and, in one embodiment, ranges from 10 to 20 degrees.

To redirect the light toward the light modulating layer 107, a turning lens 103 may be provided to fold the optical path of illuminating rays, such as rays 151 and 153, thereby directing light from the optical cavity 120 to the light modulating layer 107. The example turning lens 103 includes a structured surface 103a facing the optical cavity 120 and a relatively planar surface 103b on the opposite side. The structured surface 103a may, for example, include multiple prisms. The turning lens 103 may, for example, bend the low angle rays to a direction substantially normal to the light modulating layer surface 118 as shown. The optical cavity 120 may further include a reflector 101 disposed adjacent to surface 116 to reflect light escaping from surface 116 back into guide 102, where at least some of it will eventually, after one or more reflections, leave guide 102 through surface 114. A diffuser 104 may, optionally, be included to, for example, widen the range of directions of viewability of display apparatus 100, since light rays 151 and 153 may, with some light sources, be collimated into a relatively narrow range of directions. Optional diffuser 104 may also, in some cases, improve the appearance of display 100 in other ways, such as providing a more uniform appearance to display 100.

The example display apparatus 100 further includes a diffusely reflecting polarizer (DRP) disposed between the turning lens 103 and the light modulating layer 107 for receiving the redirected light and transmitting a component of the redirected light having a first polarization toward the light modulating layer 107 and diffusely reflecting a component of the redirected light having a second polarization different than the first polarization toward the light guide 102.

Figure 1B:
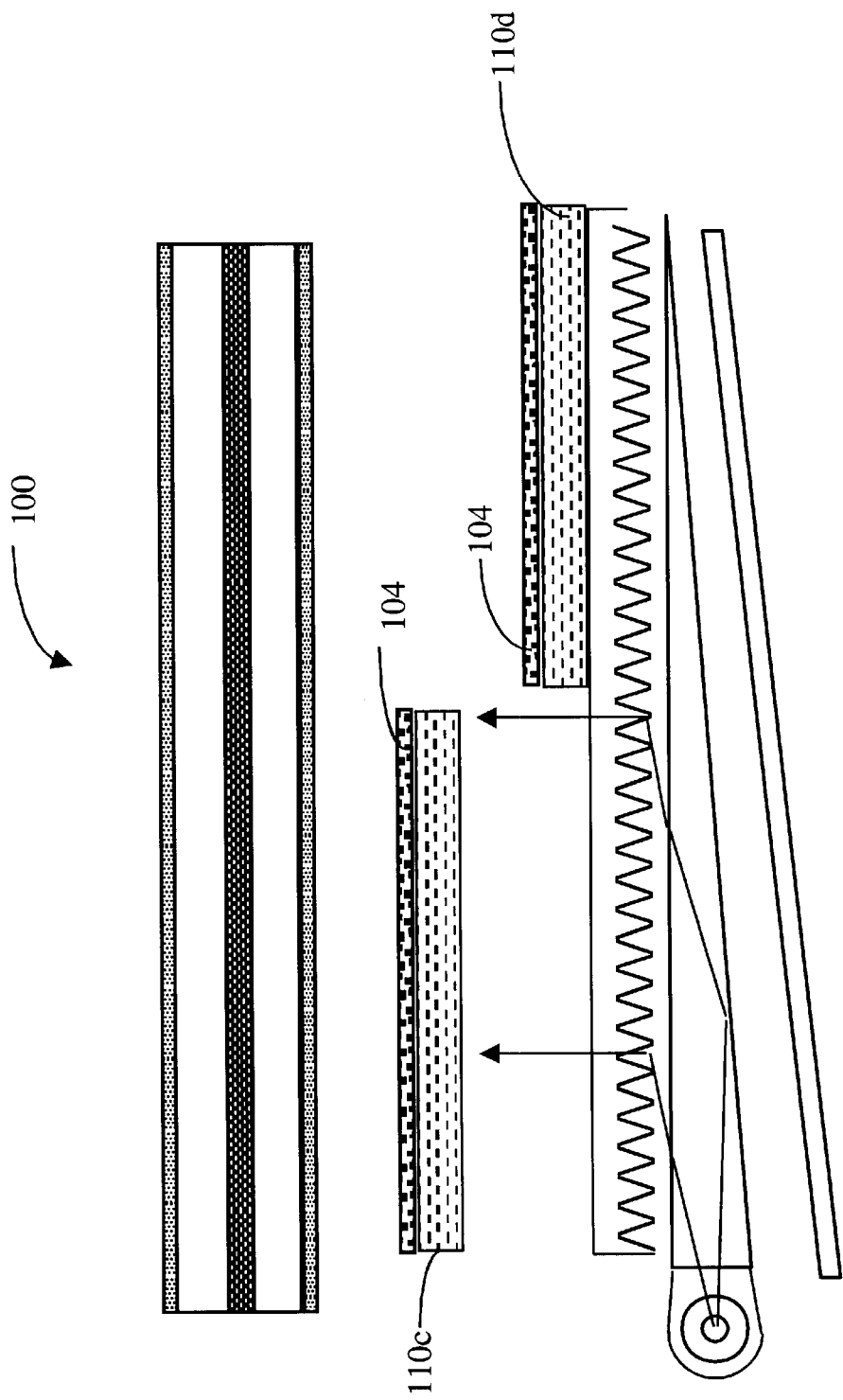
FIG. 1B illustrates an exemplary display apparatus in accordance with another embodiment of the invention.
Figure 1C:
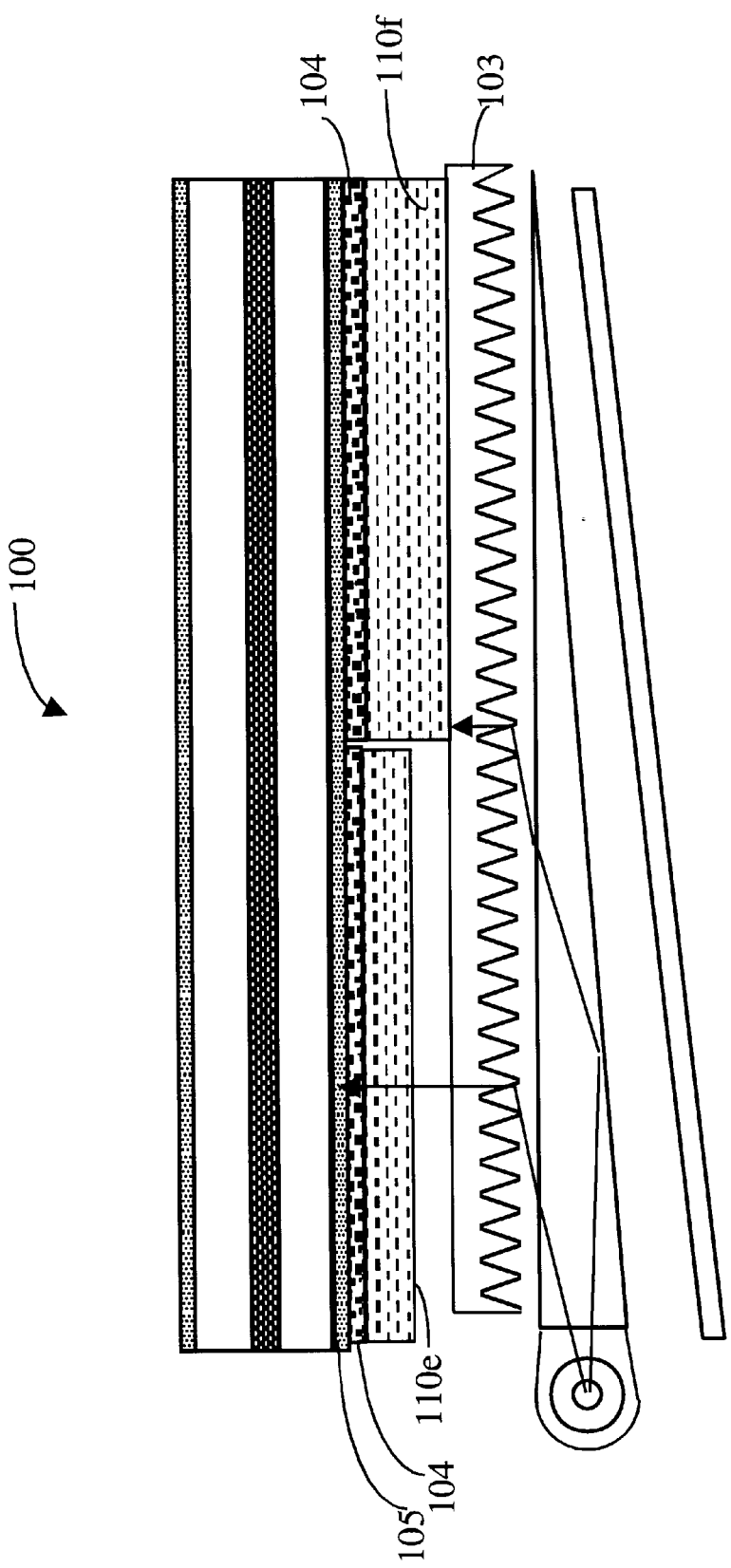
FIG. 1C illustrates an exemplary display apparatus in accordance with yet another embodiment of the invention.

In one embodiment, a DRP layer 110a is disposed between turning lens 103 and diffuser 104, without being attached to other components (as shown on the left side of FIG. 1A). Alternatively, a DRP layer 110b may attached, e.g. laminated, to turning lens 103 (as shown on the right side of FIG. 1A). In other embodiments, a DRP layer 110c may be attached to a diffuser 104 (as shown in the left portion of FIG. 1B) or a DRP layer 110d may be attached to both turning lens 103 and diffuser layer 104 (as shown on the right side of FIG. 1B). Referring to FIG. 1C, a DRP layer 110e may be integrated into the display apparatus 100 by attaching it to a diffuser 104, which is in turn attached to a polarizer 105 (as shown on the left side of FIG. 1C). A DRP layer 110f may be attached to turning lens 103 and to a diffuser 104, which is in turn attached to a polarizer 105 (as shown in the right side of FIG. 1C). Where the diffuser 104 is omitted, the DRP layer may, for example, be attached to the bottom side of the light modulating system (e.g. to a polarizer 105).

Furthermore, in the above embodiments, the diffuser may be omitted with the DRP layer incorporating its diffusion functionality. For example, when a DRP layer is used in embodiments without a diffuser, the surface roughness of the DRP layer may be controlled to provide surface diffusion. Alternatively, a DRP may be adjusted to provide bulk diffusion by adjusting the degree of specular transmission of the transmitted polarization state versus diffusion transmission of the transmitted polarization state.

The diffusely reflecting polarizer 110a–f and optical cavity 120 may advantageously be optimized for light recycling. In one embodiment, the optical cavity 120 reflects light with little depolarization and the diffusely reflecting polarizer 110a–f diffusely reflects light with substantial depolarization. In other words, the DRP layer 110a–f diffusely reflects light of the second polarization such that the reflected light includes a relatively large quantity of light having the first polarization. For example, the ratio of light of the first polarization to light of the second polarization may be 1:4 or more for many applications. In operation, the DRP layer 110a–f transmits light of a desired first polarization and diffusely reflects light of a second, undesired polarization. Due to depolarization, the reflected light includes a relatively large component of the desired first polarization. The reflected light passes through turning lens 103 and is re-reflected with little depolarization by optical cavity 120. Re-reflected light of the first polarization subsequently transmits through the DRP layer 110a–f and re-reflected light of the second polarization is diffusely reflected and partially depolarized to continue the recycling process. As a result, more of the light produced by the light source 111 is utilized by the display apparatus 100. In addition, recycling of the light reflected by DRP layer 110a–f over a variety of different optical paths tends to even out variations in illumination which sometimes occur in backlight illuminators.

While this embodiment works particularly well with reflectors providing little depolarization, the invention is not so limited. Other, more depolarizing reflectors and optical cavities may be employed with or without substantially depolarizing DRP layers. In addition, in other embodiments, the angular depolarization characteristics of the DRP and light cavity may be set such that the optical cavity significantly depolarizes light at incident angles containing relatively large amounts of non-depolarized light from the DRP and vice versa.

The diffusion of a DRP is typically much higher in the plane containing the cross-stretch and normal axis compared to the plane containing the stretch and normal axis. Where the diffusion is desired to obscure the extraction pattern, the extraction pattern should be optimized for use with the DRP. For example, if the DRP is oriented at 45°, the optimum orientation of, for example, the extraction pattern is typically at 0°.

In some embodiments, non-polarizing components may be included within the oriented film to achieve diffusion. For example, the precursor film may be coextruded or coated before stretching with a composition that does not take on significant birefringence during stretching at conditions necessary to make the DRP. Examples of suitable compositions include acrylic and styrene: acrylic copolymer macrospheres in a PMMA host.

Figure 2:
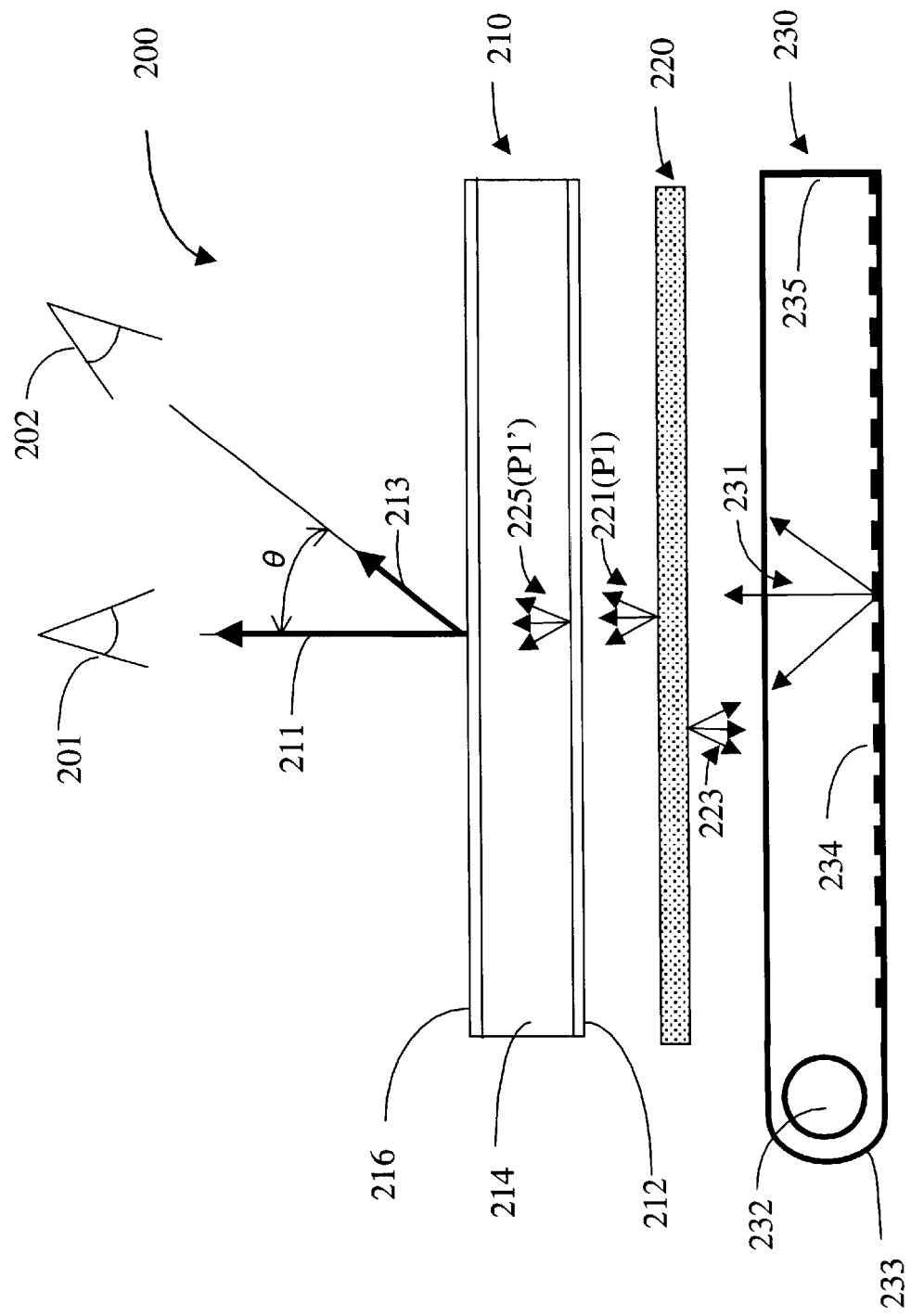
FIG. 2 illustrates an exemplary display apparatus in accordance with another embodiment of the invention.

FIG. 2 illustrates a display apparatus having a DRP layer with a selected gain distribution. The example display apparatus 200 includes a DRP layer 220 and a light cavity 230 which, in the illustrated embodiment, utilizes a light source 232 and a reflector 233 to produce diffuse light rays 231, incident upon the DRP layer 220. The display apparatus 200 further includes a light modulating layer 210 which, in the example embodiment, includes a liquid crystal layer 214 disposed between two polarizers 212 and 216. The DRP layer 220 transmits light 221 having polarization P1, thereby separating it from light 223, which is diffusely reflected back to cavity 230. Light 221 (P1) is incident upon first polarizer 212 of light modulating layer 210, which has its transmission axis oriented parallel to the transmission axis of DRP layer 220, so as to transmit light 225 (P1') having polarization P1' into liquid crystal layer 214. Polarization P1' typically differs from polarization P1 in that it is usually more purely linearly polarized, by virtue of having passed through polarizer 212, which is typically an absorbing dichroic polarizer capable of producing high levels of linear polarization.

In the example embodiment, the liquid crystal layer 214 is made up of an array of electronically addressable liquid crystal pixel elements which are individually addressed by the application of electric fields through an array of electrodes to align the liquid crystal material of each pixel in either an optically inactive state (e.g., voltage-on, that is to say, when the electric field is applied) or in an optically active state (e.g., voltage-off, or, when no electric field is applied). As used herein, the term optically active means that the orientation of the plane of polarization of polarized light passing through the optically active material is altered. The second polarizer 216 functions as an analyzer to either transmit or block light transmitted by the pixels making up liquid crystal layer 214, depending upon the direction of polarization of the transmitted light, as determined by whether each pixel is in an optically active or optically inactive state. By appropriately applying voltage to individual pixels in the liquid crystal array in an imagewise manner, a viewable image is formed by display 210. While a liquid crystal display with a liquid crystal layer is illustrated, the invention is not so limited. Other types of displays may benefit be employing selected gain distribution.

DRP layer 220 improves the light utilization of liquid crystal display 210 by reflecting light 223 back to reflecting cavity 230, where a portion of it is re-reflected back toward DRP layer 220, which again transmits that portion having polarization P1 and substantially reflects the remaining portion, thereby adding to the illumination of display 210. This process, called light recycling, continues until all of light 231 is either transmitted by DRP layer 220, with polarization P1, or lost to absorption. Light recycling has been found to significantly increase the light utilization. Increased light utilization can increase the brightness of a liquid crystal display, for a given level of optical cavity illumination, or, alternatively, it can allow a lower level of optical cavity illumination to achieve the same brightness, thereby reducing energy consumption. The DRP layer 220 and light cavity may further be optimized to recycle light. For example, the DRP layer 220 may, for example, substantially depolarize diffusely reflected light to facilitate light recycling with a light cavity having less depolarization characteristics. Alternatively, the angular depolarization characteristics of the two components may be set such that the light cavity significantly depolarizes light at incident angles containing relatively large amounts of non-depolarized light and vice versa, as noted above.

The example DRP layer 220 includes a selected gain distribution. Gain generally refers to the ratio of the luminance a display with a DRP layer to the luminance of the display without the DRP layer. The selected gain distribution can be provided by, for example, selecting the concentration of the dispersed phase relative to the concentration of the continuous phase. By way of example, increasing the concentration of disperse phase relative to the concentration of continuous phase typically increases the on-axis gain relative to the off-axis gain. Conversely, decreasing the concentration of disperse phase relative to the concentration of continuous phase will typically decreases the on-axis gain relative to the off-axis gain. For example, with a film providing an on-axis gain of 1.35 and a 40 degree (relative to normal) gain of 1.29, by increasing its disperse phase concentration and decreasing its continuous phase concentration, the film's on-axis gain may increase to 1.44 and its off-axis 40 degree gain may decrease to 1.18. Depending on the desired gain distribution, the concentration of the dispersed phase can be selected.

The table below illustrates on-axis gain and off-axis gain (−60 degrees to normal) of DRPs with different dispersed phase concentrations.

TABLE 1

| Dispersed Phase Concentration | On-axis Gain | Off-axis Gain (−60°) |
|---|---|---|
| 45 | 1.37 | 1.07 |
| 40 | 1.36 | 1.27 |
| 30 | 1.35 | 1.47 |

The selected gain distribution can be provided to improve the viewability of display 210 by controlling the light distribution seen by viewers such as 201 and 202, as typified by rays 211 and 213. A useful parameter for describing luminance distribution is the half height angle θ, i.e., the angle at which the luminance is half the maximum luminance (which is assumed to be on-axis in this case). If, for example, ray 211 represents the luminance of a bright portion of the image displayed by display 210 when viewed at normal viewing angle, and ray 213 represents a ray emanating from the same point on the image having half of the luminance of ray 211, then angle θ, called the half height angle, is a measure of the breadth of the light distribution for the displayed image.

It will be appreciated that for a given level of rumination from rays 221, increasing θ distributes the light available for viewing more evenly, thereby lowering the maximum luminance, which typically occurs at normal viewing angle, as represented by ray 211. In a display which is to be viewed from a wide range of angles, this may be a desirable situation. In situations wherein a single viewer is viewing the display at substantially normal angles, however, it may be desirable to conserve energy by reducing θ so as to brighten the display for that viewer. Typically, an increase in disperse phase concentration reduces angle θ, thereby narrowing the distribution of light available for viewing and providing a brighter display for viewer 201, for example, while trading off brightness for viewer 202. Conversely, reducing the concentration of the disperse phase in layer 220 increases θ, thereby evening out the distribution of light available for viewing the display.

A DRP layer having a particular gain distribution may be manufactured by selecting the relative concentrations of the dispersed phase and continuous phase to provide a desired gain distribution. This selection may take into account a concentration of a compatabilizer phase. It will be appreciated that the ability to design the light distribution in this way is a desirable feature for display designers, since it enables them to produce displays for a variety of different viewing applications merely by selecting different DRP materials, based upon the concentration of disperse phase present in layer 220.

Figure 3A:
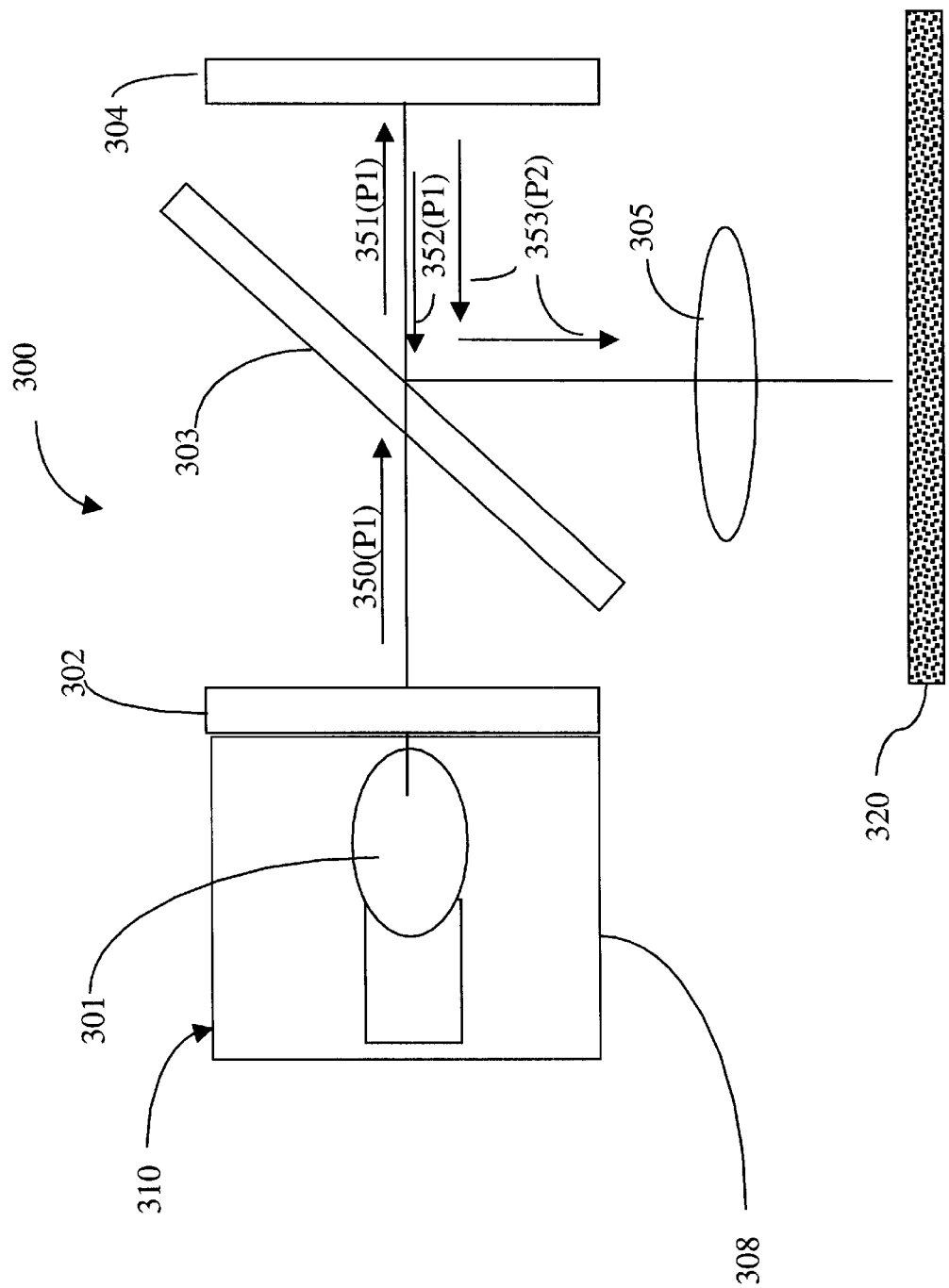
FIG. 3A illustrates an exemplary projection display system in accordance with an embodiment of the invention.

FIG. 3A illustrates an exemplary projection display system in accordance with another embodiment of the invention. The exemplary projection display system 300 utilizes an illuminator 310 to illuminate a reflective imager 304, with the resulting image being reflected by a polarizing beam splitter 303, through projection lens 305, onto screen 320. Illuminator 310 typically includes a light source 301, optical enclosure 308, and beam conditioner 302. Beam conditioner 302 may comprise lenses or other beam shaping components, optical filters to remove infrared or ultraviolet wavelengths of light, and reflective polarizing materials, such as a DRP layer. Optical enclosure 308 may comprise an inner surface which is diffusely reflecting, or which contains polarization altering means such as birefringent layers. Optical enclosure 308 is not limited to a rectangular shape, but may be of any suitable shape, and may further contain structures on its inner surface which give it yet other effective internal optical shapes.

Polarizing beam splitter 303 typically comprises a reflective polarizing material. It is desired that beam splitter 303 reflect image rays 353 in a substantially specular manner so as to preserve the image produced by imager 304. Therefore, it is advantageous that the disperse phase of any multiphase reflecting material used in beam splitter 303 be in the form of uniformly oriented particles having a high, preferably substantially infinite, radius of curvature, so as to reduce the diffuse component of the reflected light. Suitable particles could include flakes, platelets, or other particles having substantially flat, orientable surfaces.

In use, illuminator 310 illuminates imager 304 through polarizing beam splitter 303. It is often desired that light 350 from illuminator 310 be prepolarized to, for example, polarization P1 by beam conditioner 302 acting in cooperation with enclosure 308 to recycle light of undesired polarization. Beam splitter 303 further polarizes light 350 and provides polarized light 351 to the reflecting imager 304, which may, for example, include an array of liquid crystal elements representing pixels of a digital image. Depending upon the voltage applied to each pixel, the polarization of light 351 striking the pixel is either rotated or left unrotated, and reflected back toward beam splitter 303. Beam splitter 303 reflects light 353, which has been rotated in polarization from polarization P1 to polarization P2, through projection lens 305, and then to screen 320, onto which the image created by reflective imager 304 is projected. Beam splitter 303 transmits light 352 having unaltered polarization P1 back to illuminator 310, so that the pixels representing this polarization appear dark on screen 320. A portion of the light transmitted back to illuminator 310 may be reflected, repolarized, and recycled.

Figure 3B:
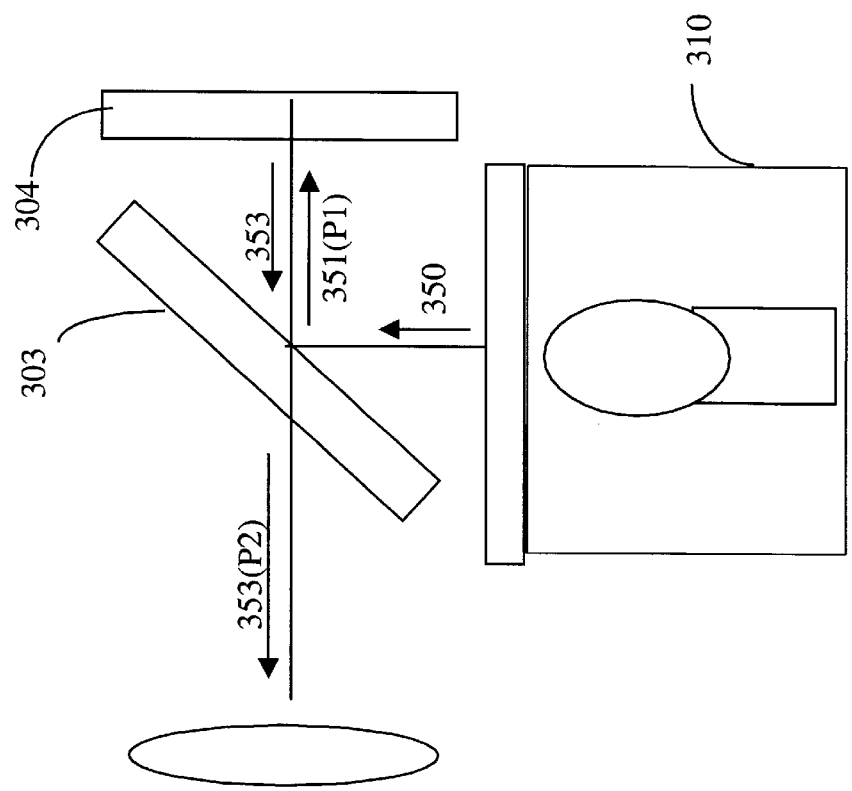
FIG. 3B illustrates an exemplary projection display system in accordance with another embodiment of the invention.

An alternative embodiment of the above system is shown in FIG. 3B, wherein the light reflected by beam splitter 303, rather than the light transmitted by beam splitter 303, is used as illumination for imager 304. The imager 304 reflects light 301 of polarization P1 or P2 depending on its pixel states. The beam splitter 303 then transmits P2 polarized light 353 (P2) and reflects P1 polarized light back toward the illuminator 310. In this case, beam splitter 303 may be a diffusely reflecting polarizer, which transmits substantially specularly. Optical layouts for projection displays of this type can be made more compact than some conventional projection apparatus, since it is a feature of the diffusely reflecting polarizing materials disclosed in the references incorporated hereinabove that they can be made quite insensitive to angle of incidence, and therefore able to polarize strongly diverging or converging beams, without the need for collimating optics.

Figure 3C:
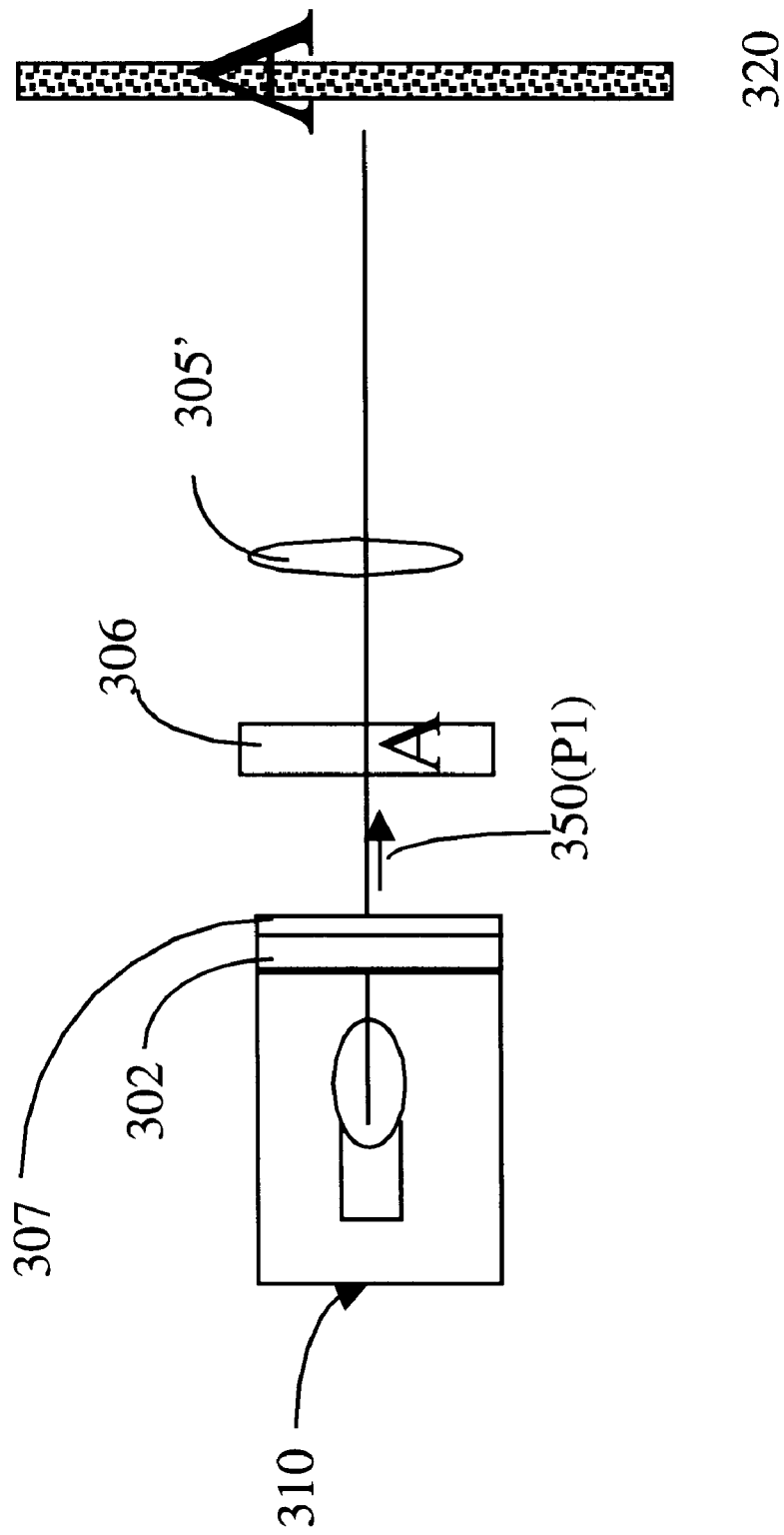
FIG. 3C illustrates an exemplary projection display system in accordance with another embodiment of the invention.

Referring to FIG. 3C, an alternative projection system is portrayed which uses transmissive imager 306, rather than the reflective imager used in the previous two systems. In this system, beam conditioner 302 and, optionally, absorbing polarizer 307, provide polarized light 350, having polarization P1, which illuminates imager 306. Imager 306 may again include an array of liquid crystal elements representing pixels of a digital image, which either transmits or blocks light 350 in an imagewise manner to form the image which is then projected, through projection lens 305, onto screen 320. The illuminator 310 may further include a reflector for redirecting and randomizing light reflected by the beam conditioner 302 toward the beam conditioner 302 for transmission therethrough, thereby recycling light. In one embodiment, the beam conditioner 302 is a DRP. In one case, the DRP depolarizes the diffusely reflected light and/or the reflector may depolarize light so that light not transmitted through the DRP can be recycled and later transmitted therethrough.

Figure 3D:
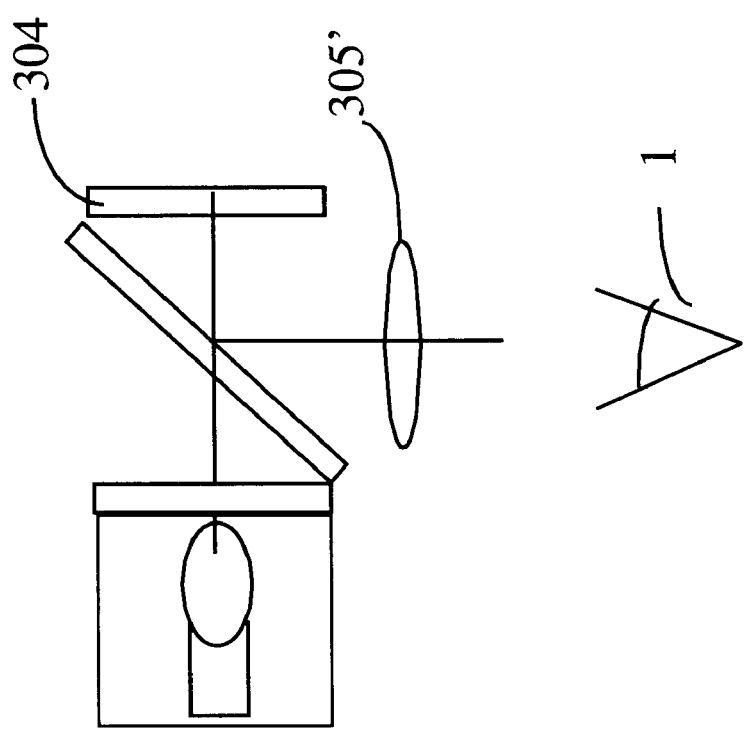
FIG. 3D illustrates an exemplary microdisplay system in accordance with another embodiment of the invention.
Figure 3E:
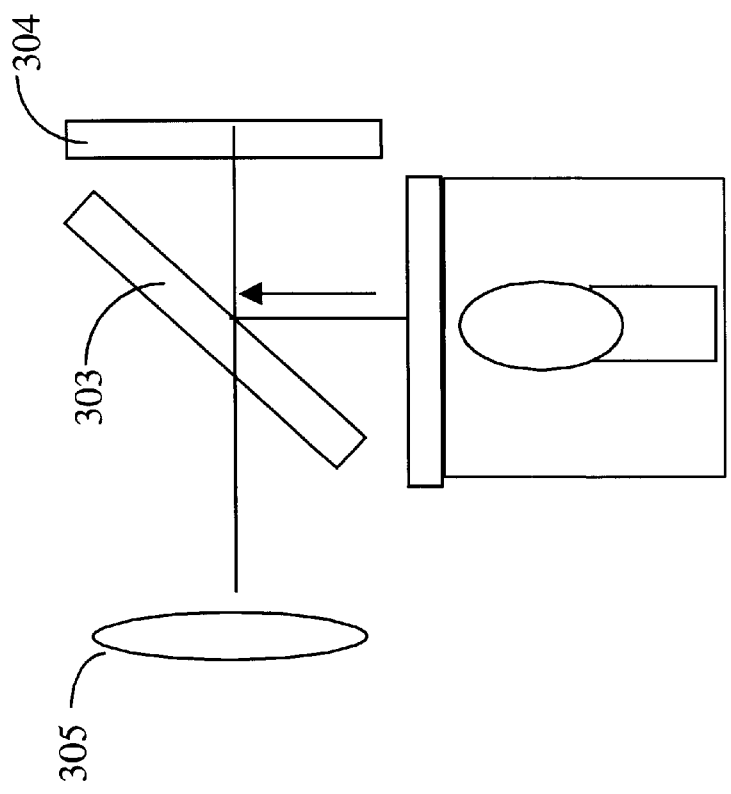
FIG. 3E illustrates an exemplary microdisplay system in accordance with yet another embodiment of the invention.
Figure 3E:
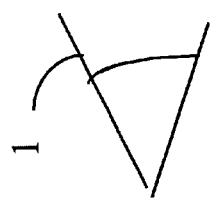

Referring to FIG. 3D, an optical layout similar to that shown in FIG. 3A can be used, with the exception that rather than projecting a real image onto a screen, a magnified virtual image of imager 304 is seen by viewer 1 using magnifying lens 305'. Displays which operate in this manner will hereinafter be called microdisplays. Referring to FIG. 3E, an optical layout similar to that shown in FIG. 3B can be used, with the exception that rather than projecting a real image onto a screen, a magnified virtual image created by imager 304 is seen by viewer 1 using a magnifying lens 305'. This layout also has the advantage that the beam splitter 303 may be a DRP, as the beam splitter 303 does not need to be specularly reflective, but only specularly transmissive.

Figure 3F:
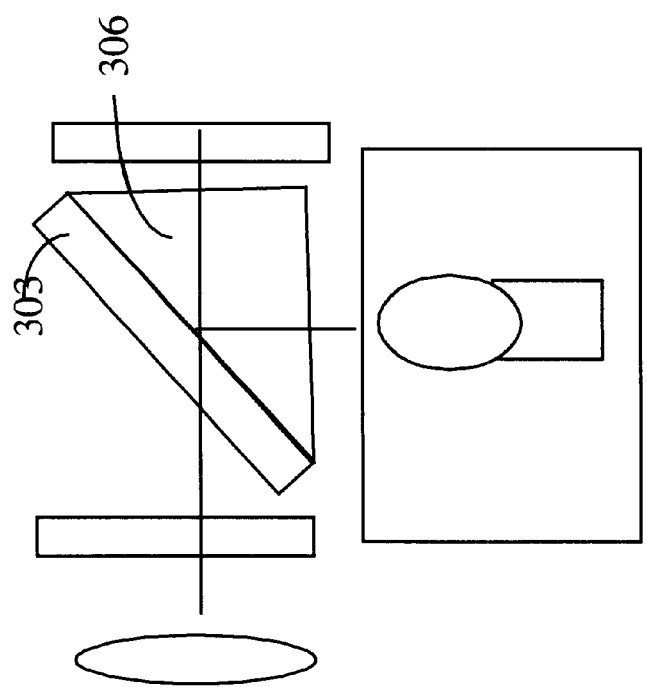
FIG. 3F illustrates an exemplary microdisplay system in accordance with yet another embodiment of the invention.
Figure 3F:
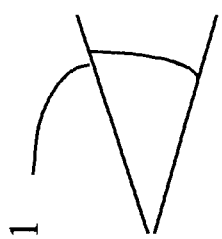
Figure 3G:
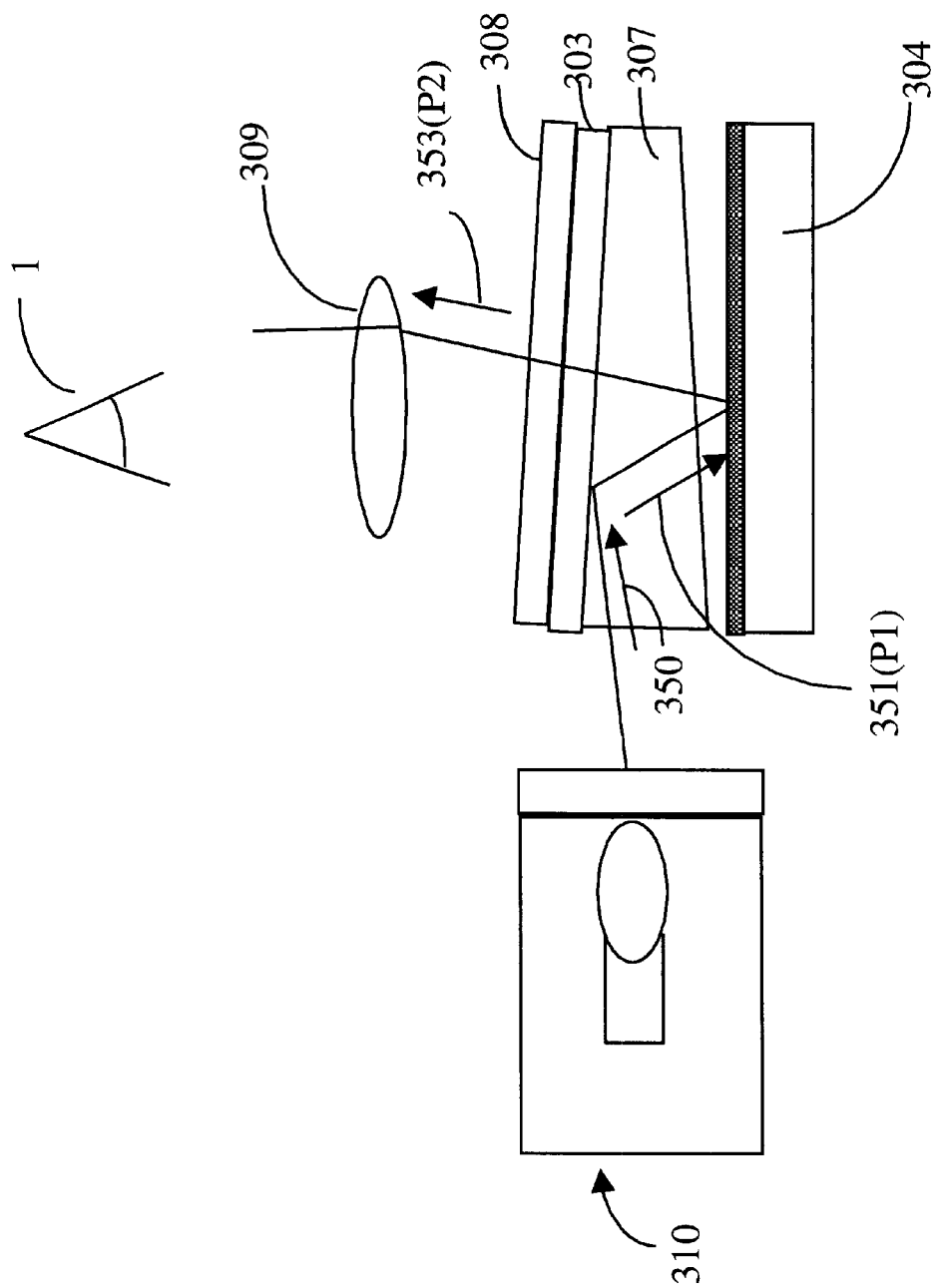
FIG. 3G illustrates an exemplary microdisplay system in accordance with still another embodiment of the invention.

In an alternative embodiment similar to FIG. 3E, polarizing beam splitter 303 is laminated or otherwise attached to transparent cube 306 to form a more compact layout, as shown in FIG. 3F. In yet another embodiment, portrayed in FIG. 3G, light 350 from illuminator 310 enters light guide 307, where it is polarized by diffusely reflecting polarizer 303 while being reflected toward reflecting imager 304. Imager 304, which is typically made up of an array of liquid crystal elements representing pixels in a digital image, reflects polarized light 351 with either unaltered polarization P1 or rotated polarization P2, as determined by the voltages applied to the pixel elements of imager 304. Light 353, having polarization P2, is the portion of the light reflected from imager 304 which has the polarization transmissible by reflective polarizer 303, so that it passes through polarizer 303 to an optional polarizer 308. Polarizer 308 can be, for example, an absorbing polarizer which filters out any light having polarization P1, thereby preventing wrongly polarized light from reaching viewer 1. Viewer 1 then views a magnified virtual image created by reflective imager 304 through magnifying lens 309.

Figure 4A:
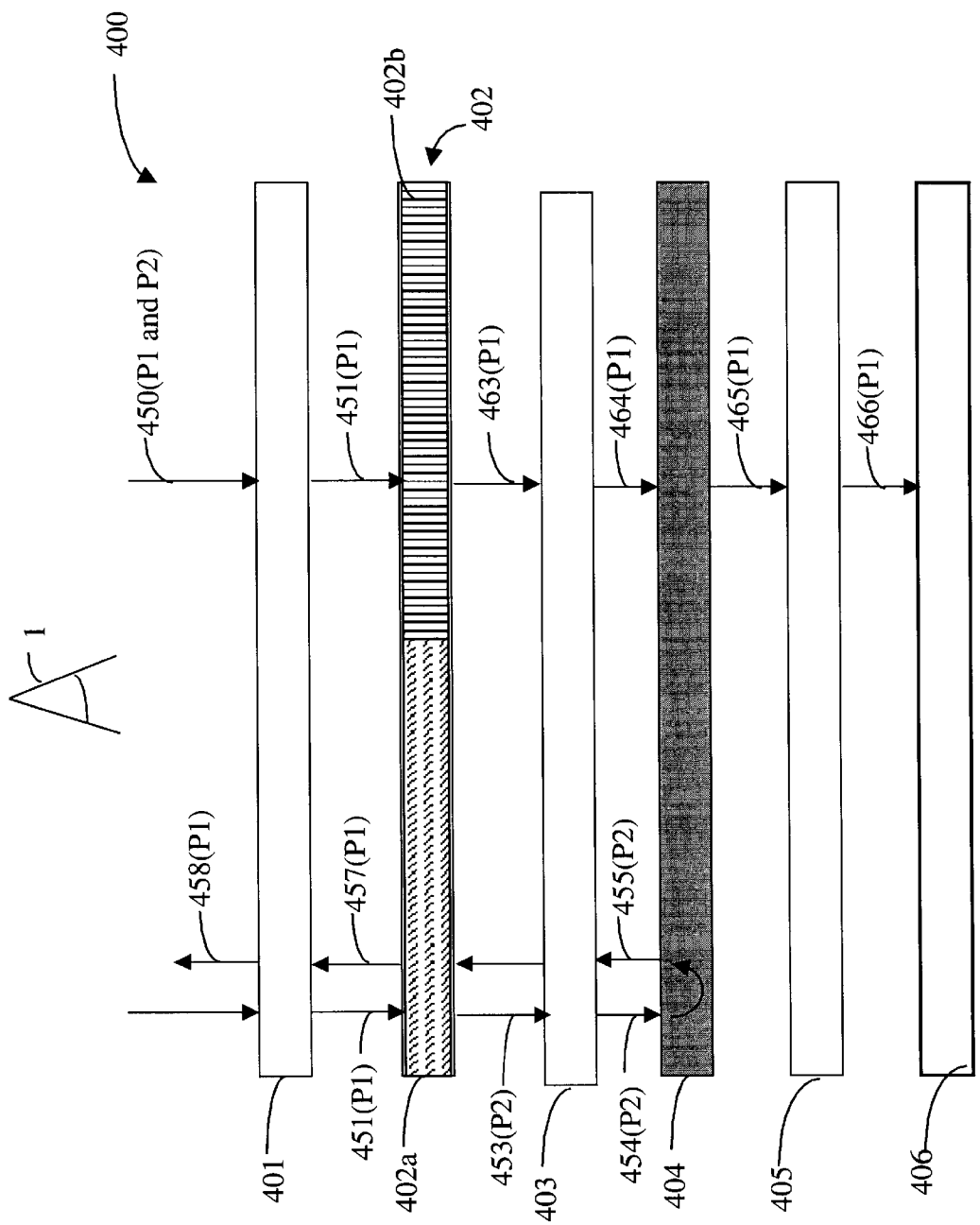
FIGS. 4A–4B illustrates an exemplary transflective display apparatus in accordance with an embodiment of the invention.
Figure 4B:
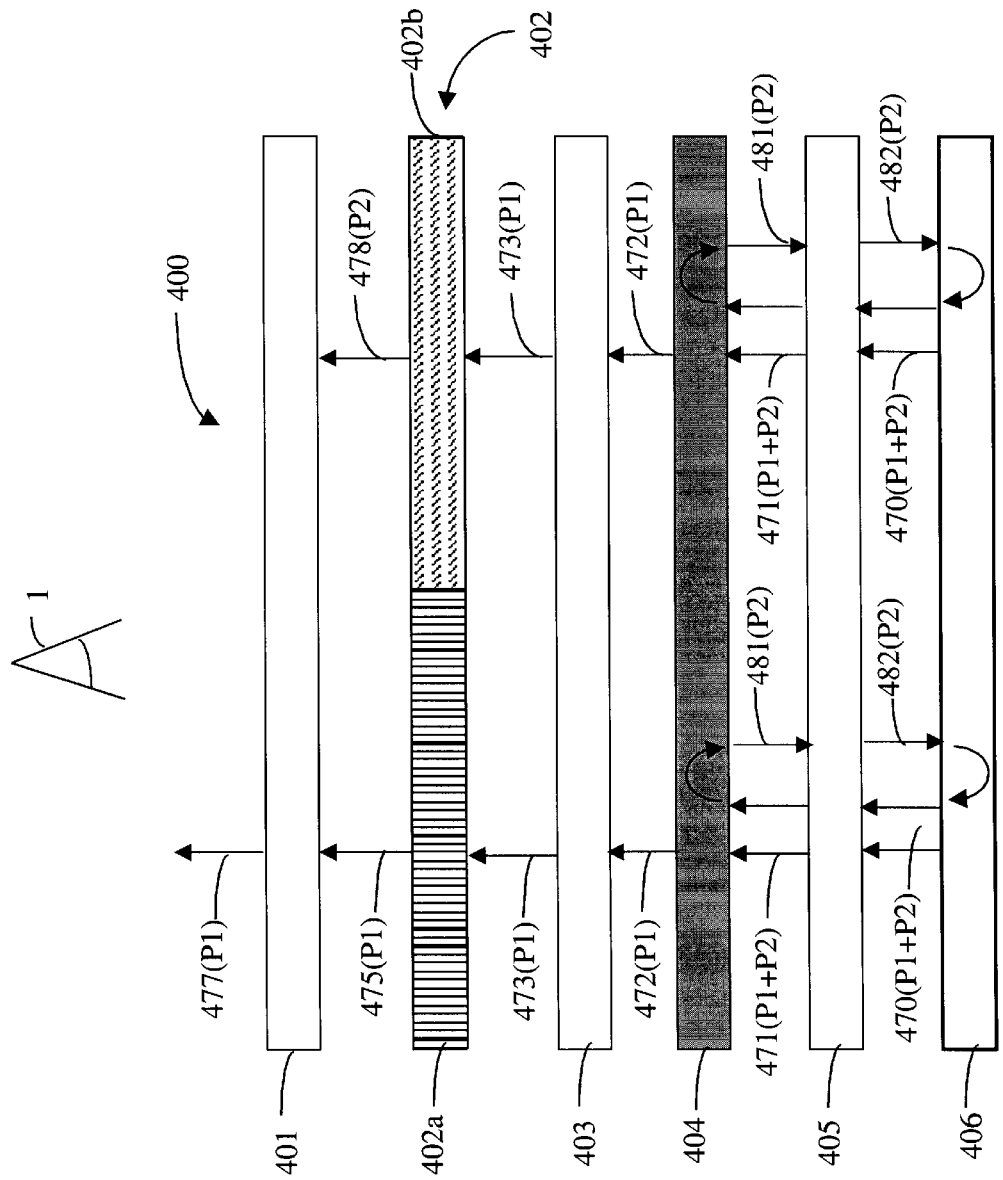

FIGS. 4A–4B illustrate a transflective light modulating display apparatus using a DRP layer. In general, a transflective display typically includes a light modulating layer made up of an array of light valves or pixels, each of which represents a pixel of a digital image. Transflective displays can operate in either a reflective mode, in which the display primarily relies on ambient light entering from the viewing side for illumination, or in a transmissive or backlit mode, in which the display primarily relies on light emanating from an optical cavity opposite the viewing side for illumination. Examples of transflective light modulating displays include those which use twisted or supertwisted nematic liquid crystal layers. Liquid crystal displays of these types typically operate by either rotating or leaving unrotated the plane of polarization of a beam of linearly polarized light.

The example transflective light modulating display apparatus 400 includes an absorbing polarizer 401, a light modulating layer 402, disposed on a side of absorbing polarizer 401, a diffusely reflecting polarizer 404, disposed on a side of the light modulating layer 402 opposite the absorbing polarizer 401, a light trapping layer 405, disposed on a side of the diffusely reflecting polarizer 404 opposite the light modulating layer 402, and an optical cavity 406 disposed on a side of the light trapping layer 405 opposite the diffusely reflecting polarizer 404. The example display apparatus 400 further includes an optional polarization preserving diffuser layer 403.

Operation of the example display 400 will now be described. With reference to FIG. 4A, a pixel 402a of a light modulating display 400 is portrayed in the voltage-off state, which produces a bright pixel when illuminated by ambient light. In this state, unpolarized ambient light enters the display through absorbing polarizer 401, which passes that portion of the light having polarization P1, represented by ray 451. Ray 451 then passes through light modulating pixel layer 402, where its polarization is rotated, due to the display being in the voltage-off state. This produces light 453, which has polarization P2. Light 453 may then passes through polarization preserving diffuser 403, which maintains the polarization P2, and passes on to DRP layer 404, where it is diffused backwards, as ray 455, since DRP layer 404 has been aligned at an orientation which diffusely reflects light having polarization P2. Depolarization of the diffusely reflected ray 455 is typically minimized to increase the amount of polarization P2. Ray 455 again passes through diffuser 403 and then through light modulating pixel layer 402a, where its polarization is again rotated to P1, thereby allowing it to pass through absorbing polarizer and be seen as a bright pixel by viewer 1.

On the right side of FIG. 4A, a pixel 402b of the light modulating layer 402 is portrayed in the voltage-on state, which produces a dark pixel when illuminated by ambient light. In this state, unpolarized ambient light enters the display through absorbing polarizer 401, which passes that portion of the light having polarization P1, shown as 451. Ray 451 then passes through light modulating pixel layer 402, where its polarization remains unchanged, due to pixel 402b being in the voltage-on state, thereby producing ray 463, which still has polarization P1. Ray 463 may then passes through polarization preserving diffuser 403 and passes on to DRP layer 404, where it is transmitted, as ray 465, since DRP layer 404 has been aligned at an orientation so as to transmit light having polarization P1.

Ray 465 then enters light trapping layer 405, which traps the light 465 to show a dark pixel to the viewer 1. The light trapping layer 405 may comprise light absorbing dyes or pigments, or polarization rotating components. In many cases, some light 465 will be reflected by the light trapping layer 405 toward the DRP layer 404. Some light may also pass through trapping layer 405, be reflected by cavity 406 and re-pass through trapping layer 405 toward DRP layer 404. In the latter case, the amount of light is typically quite small due to multiple passes through the trapping layer 405. With either component of light, the DRP layer 404 and underlying trapping layer 405 and cavity 406 may be optimized to rotate the polarization of the light to P2 so that it reflects off the DRP layer 404 rather than transmits therethrough.

Referring to FIG. 4B, a pixel 402a in the voltage-on state (left side), operated in the backlit mode, is portrayed. In the backlit mode, the voltage-on state produces a bright pixel. Unpolarized light is produced by optical cavity 406, after which it passes, with some possible attenuation, through light trapping layer 405, to DRP layer 404. DRP layer 404 diffusely reflects the portion of ray 471 having polarization P2 back to light trapping layer 405 and thence to optical cavity 406, where it may be reflected, changed in polarization, and recycled back for another try at getting through DRP layer 404. Any light which is successfully recycled in this way contributes the improvement of the light utilization efficiency of the display system. The portion of ray 471 which has polarization P1 is transmitted by DRP layer 404 and passes on through optional diffuser 403 to light modulating pixel layer 402a. Since pixel 402a is in the voltage-on state, it passes ray 473 without altering its polarization, to absorbent polarizer 401. Since absorbent polarizer 401 transmits light having polarization P1, ray 473 leaves display 400 and is seen by viewer 1 as a bright pixel.

To the right side of FIG. 4B, a pixel 402b in the voltage-off state, operated in the backlit mode, is portrayed. In the backlit mode, a voltage-off state produces a dark pixel. The light produced by optical cavity 406 reaches pixel 402b in the same manner as in the voltage-on state, but in this case, since the pixel 402b is in the voltage-off state, the polarization of ray 473 is rotated to polarization P2, after which it is absorbed by absorbent polarizer 401, so that the pixel in this case as seen as a dark pixel. In this manner, a transflective display is provided in which the state, e.g. bright or dark state, of a pixel changes between backlit mode and ambient mode for a given voltage state, e.g., on or off. In addition, the diffusely reflecting properties of DRP can be used in transflective displays to provide a lighted matte surface which functions as a light background when the display is lighted by ambient light, while providing light recycling when the display is functioning in the backlit mode with low ambient light.

In another embodiment, a contrast enhancing filter using a reflective polarizer, such as a diffusely reflective polarizer, is provided. Such a contrast enhancing filter can, for example, provide higher display brightness with equal contrast when compared to conventional contrast enhancing filters. Contrast enhancing filters are often used on emissive information displays, many of which are based on an inorganic or organic light emitting material which is excited in an addressable matrix to form an image. The light emitting material, e.g., phosphor, and backing typically is a good reflector of visible light. As a result, without a contrast enhancing filter, the reflectivity of the light emitting material can cause the display to "wash-out" under conditions of high ambient illumination.

Figure 5A:
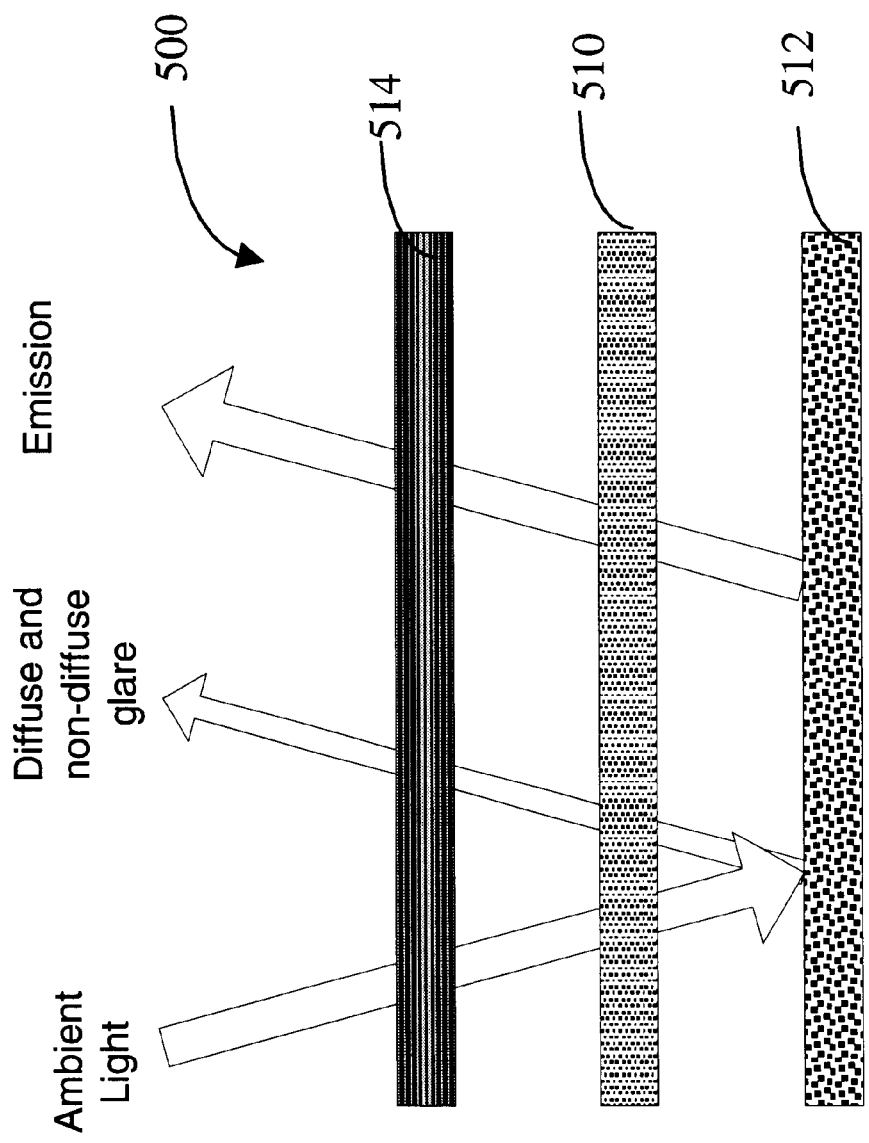
FIG. 5A illustrates a display having a conventional contrast enhancing filter.

A conventional CE filter shown with an emissive element is illustrated in FIG. 5A. The conventional CE filter 500 typically includes a transparent material, e.g., tinted polarizer 510, with a moderately high absorptivity for visible light. Light emitted from the emissive element 512 passes through the tinted absorber 510 once, whereas ambient light must pass through it twice. By way of example, a sheet 510 absorbing 50% of visible light will reduce emitted light by 50% and ambient diffuse and non-diffuse glare by 75%. In practice, the reduction is somewhat higher since the effective reflectivity of the emissive 512 element is usually less than 100% (e.g., due to phosphorescence and wavelength shifting). In the above example, contrast is increased by 2 fold. The conventional CE filter 500 may further include an absorbing polarizer 514 with or without a tint. The principle of operation is very similar to the simple tinted situation.

While the conventional CE filters using absorbing polarizers improve contrast, they also substantially reduce brightness. The reduction in brightness can significantly degrade the appearance of the display. Therefore, a need in the display industry is a contrast enhancing layer that has a relatively high brightness.

Figure 5B:
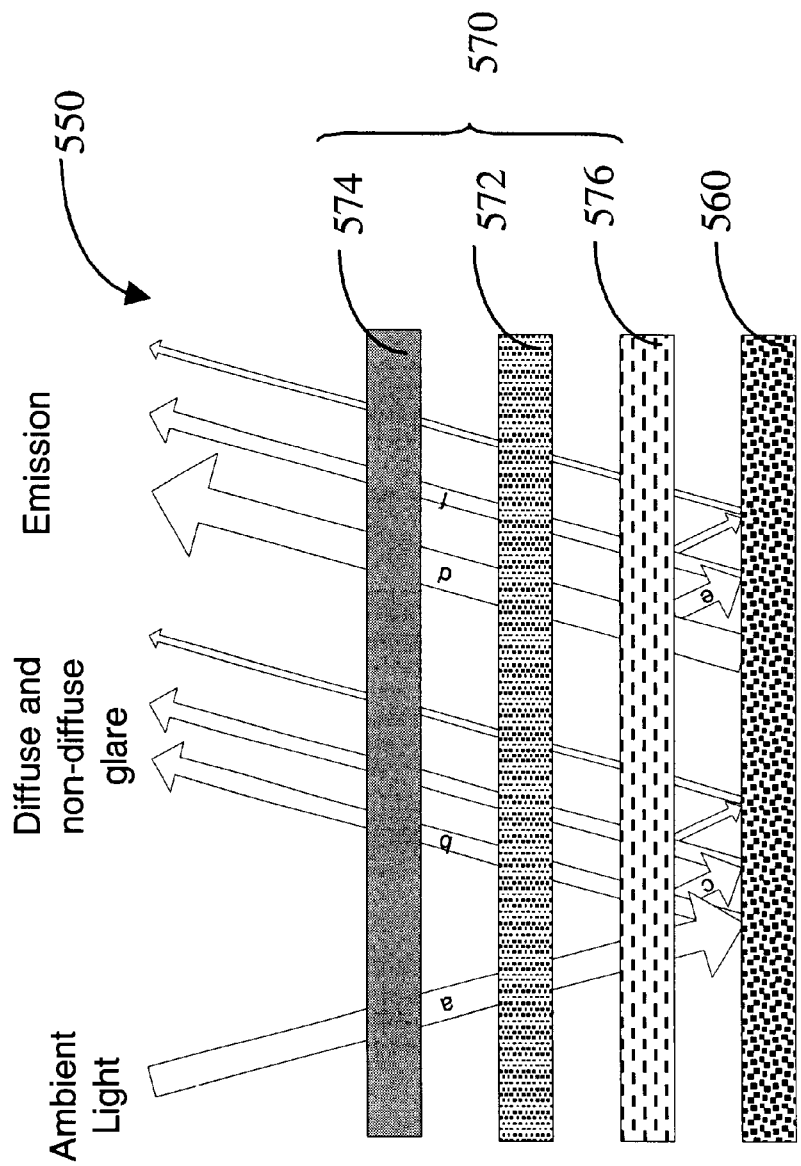
FIG. 5B illustrates a display having a contrast enhancing filter in accordance with an embodiment of the invention.

FIG. 5B illustrates an exemplary display which includes a contrast enhancing (CE) filter having a reflecting polarizer in accordance with an embodiment of the invention. The reflecting polarizer may, for example, be a diffusely reflecting polarizer. The example display 550 includes an emissive element 560, such as phosphor, for example, and a CE filter 570, along with optional tinted layer 572. The example CE filter 570 includes an absorbing polarizer 574 and a reflecting polarizer 576 typically aligned for highest transmission. The absorbing polarizer 574 and reflecting polarizer 576 may be provided as a laminate, for example. Typically, the laminate is intimately attached to the emissive element with the reflective polarizer on the side towards the emissive element. The emissive element 560 is typically built directly onto the reflective polarizer 576. This can be accomplished in evacuated displays by suitably degassing the reflective polarizer film before sealing into the display.

One or more optional tinted layer(s) 572 may be disposed either above or below the reflective polarizer 576, or both. Providing a tinted layer 572 above the reflective polarizer 576, as shown in FIG. 5B, typically increases display contrast with the minimum effect on brightness. A tinted layer 572 disposed below the reflective polarizer 576 will also typically increase contrast, with a higher impact on brightness. The former position has the advantage of reducing the distance between element 560 and DRP 576.

FIG. 5B shows two light rays interacting with the contrast-enhanced display. One ray is display emitted light ray d. Ray d first interacts with the reflective polarizer 576, splitting the ray into transmitted ray d and reflected ray e.

Ray d is attenuated by the optional tint layer 572, and is transmitted by the absorbing polarizer 574. Reflected ray e is scattered by the emissive element 560, producing a reflected ray f. Ray f then follows the same process as ray d. The display brightness is then Ray d plus ray f, etc. The ambient ray a is first absorbed by the absorbing polarizer 574, leaving about 50% of ray a transmitted. The ray is further attenuated by the tinted absorber 572, and transmitted by the reflective polarizer 576 to the emissive element 560. Once reflected from the emissive element 560, the attenuated ray b follows the same process as ray d.

The reflecting polarizer 576 is typically positioned closer to the emissive element than the absorbing polarizer 574. This can improve the image by reducing the distance between the reflecting polarizer and the emissive element. Since the emissive element will typically emit light over a wide range of angles, the image could appear diffused if the distance between the reflective polarizer 576 is significantly larger than the lateral dimensions of the emissive element 560. In one embodiment, the distance between the reflecting polarizer 576 and the emissive element is 3 times the lateral distance of the emissive element or less. In another embodiment, the distance between the reflecting polarizer 576 and the emissive element is 2 times the lateral distance of the emissive element or less. In a further embodiment this distance is equal to or less than the lateral distance of the emissive element.

The color of the tint absorber, if any, and the absorbing polarizer, if tinted, can be optimized with displays that produce colored light. If, for example, a display produces green light, the tint will ideally have a relatively high absorption in the red and blue, and a relatively low absorption in the green. This concept may be used in full color displays by providing a matrix of the color of the tinted sheet to match the color of the individual emissive elements.

An emissive element may, for example, be a pixel or a subpixel element which emits a particular color. The CE filter using a reflective polarizer and an absorbing polarizer may be used in a number of different systems having emissive elements. Such systems include, by way of example, fluorescent illuminated displays, electroluminescent displays, organic and inorganic light emitting diode displays, vacuum fluorescent displays, field emissive displays (FED), and plasma displays.

Additionally, while diffusely reflecting polarizers work particularly well, the invention is not so limited. Other types of reflective polarizers which provide linearly polarized light may be used. These other reflective polarizers include, for example, the multilayer reflective polarizer and the cholesteric reflective polarizer discussed above.

Figure 5C:
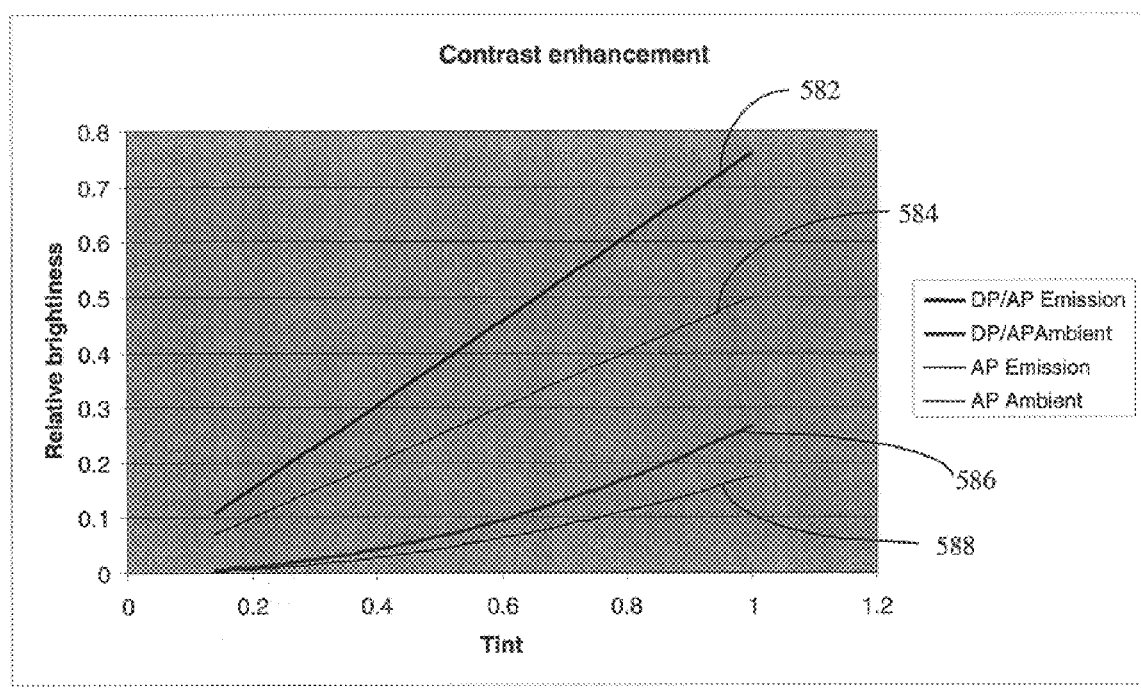
FIG. 5C is a graph illustrating relative brightness as a function of tint for contrast enhancing displays.
Figure 5D:
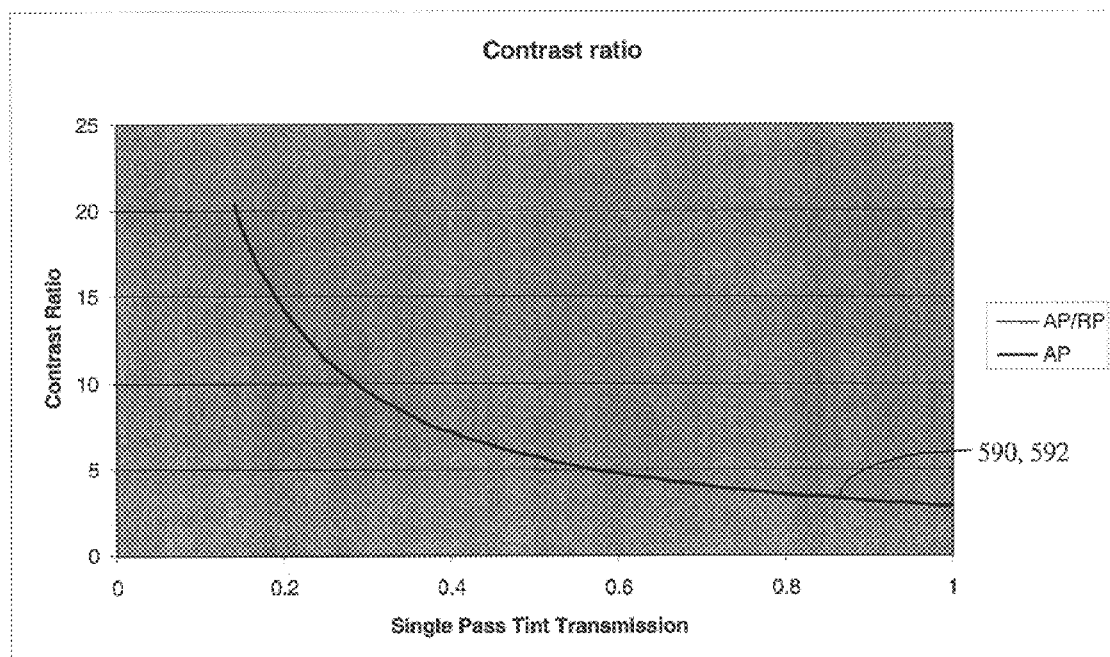
FIG. 5D is a graph illustrating contrast ratio as a function of tint for contrast enhancing displays.
Figure 5E:
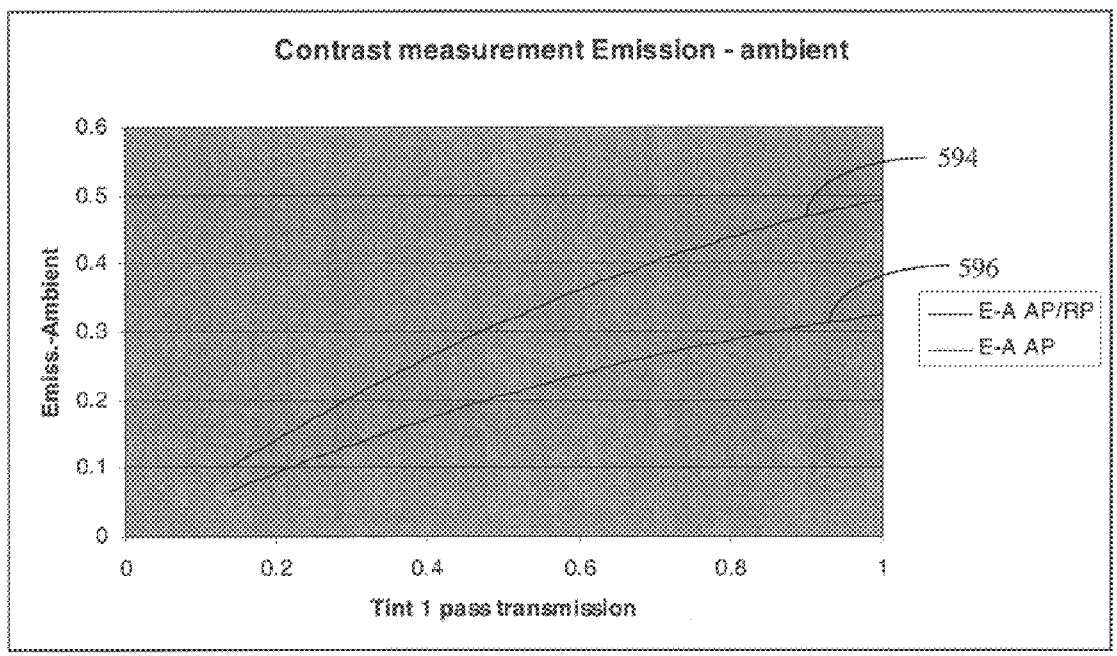
FIG. 5E is a graph illustrating another contrast characteristic graph for contrast enhancing displays.

Using a CE filter with a reflecting polarizer (e.g., a DRP), a higher display brightness can be achieved for a given contrast than with conventional CE filters without reflecting polarizers. FIGS. 5C–5E illustrate various characteristics of the CE filter having a reflective polarizer (hereinafter RP CE filter) of FIG. 5B and the conventional CE filter of FIG. 5A. FIG. 5C is a graph illustrating the relative brightness of ambient diffuse and specular glare vs. emitted brightness as a function of tint. Curves 582 and 586 show the relative brightness of emitted and ambient light, respectively, using the RP CE filter. Curves 584 and 588 show the relative brightness of emitted and ambient light, respectively, using the conventional CE filter. As can be seen the RP CE filter produces higher brightness at all tint levels.

FIG. 5D is graph illustrating the contrast ratio (i.e., the ratio of display brightness to ambient brightness) as a function of tint for the RP CE filter (curve 590) and the conventional filter (curve 592). To generate the graph, ambient light and display light were each arbitrarily set to 1 with the contrast ratio changing with changes in the ambient light. As can be seen from the graph, the highest contrast will be achieved at the highest level of tint. In addition, the curves 590 and 592 substantially overlap, thus showing that RP CE filter provides higher display brightness for the same contrast ratio.

FIG. 5E is a graph illustrating another contrast characteristic, ambient brightness less emission brightness, as a function of single pass tint transmission for the two CE filters. This contrast ratio may be used to provide an indication of the legibility (e.g., the speed and strain involved in reading information) of a display. Curve 594 illustrates this characteristic for the RP CE filter and curve 596 illustrates the characteristic of the conventional CE filter. As can be seen, the RP CE filter provides higher contrast than the conventional CE filter at all levels.

Figure 6:
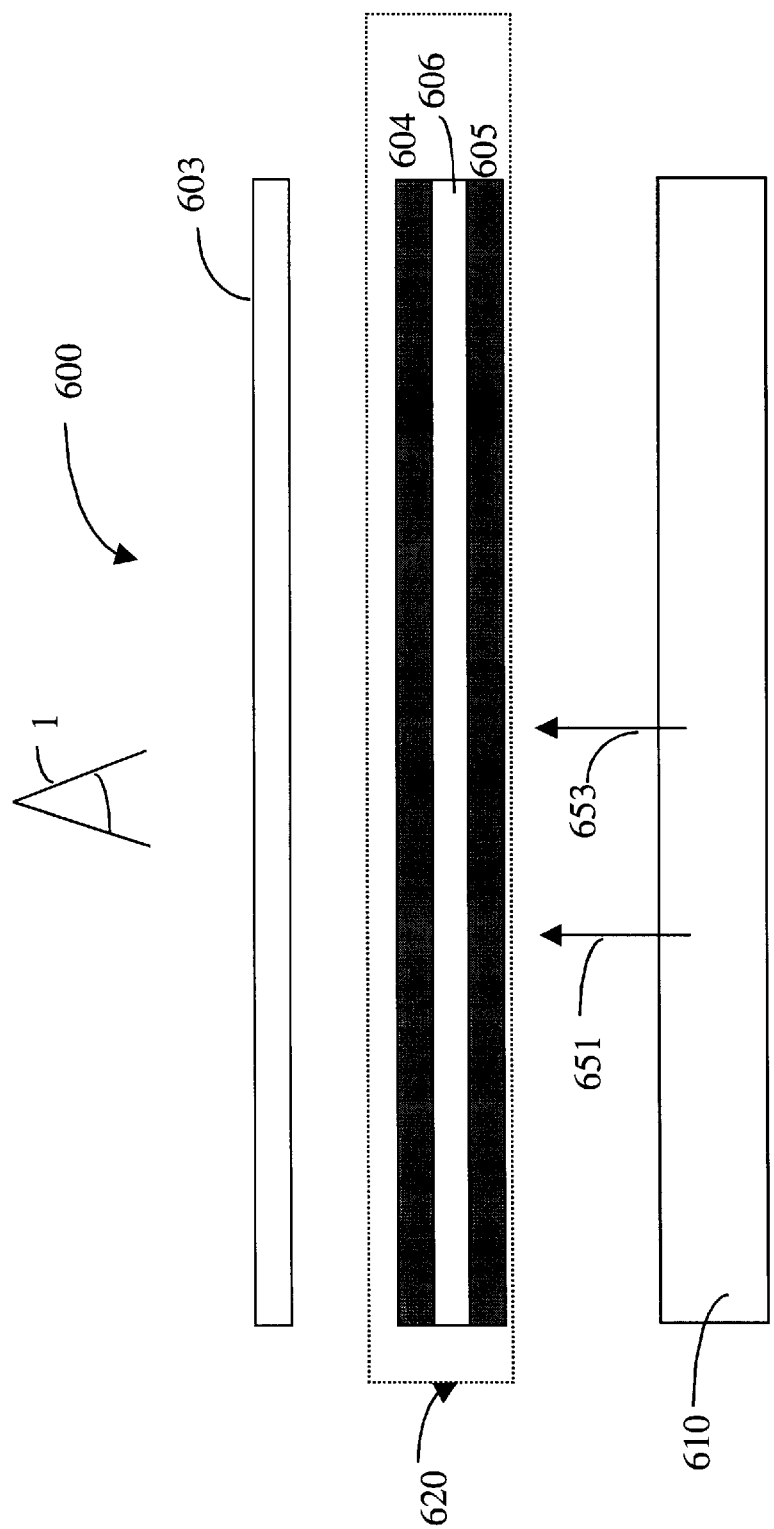
FIG. 6 illustrates an exemplary display apparatus in accordance with an embodiment of the invention.

Diffusely reflecting polarizers of the present invention can also be used to alter and improve the appearance and viewability of existing backlit light valve or modulating displays, such as backlit twisted nematic and supertwisted nematic displays. FIG. 6 illustrates a backlit display apparatus 600 which includes a light modulating layer 606, a light cavity 610 for providing light for illuminating the light modulating layer 606, and a DRP layer 603 disposed on a viewing side of the light modulating layer 606. The display apparatus 600 may, for example, be an LCD with a liquid crystal light modulating layer made up of an array of liquid crystal elements representing pixels of a digital image. The light cavity 610 may, for example, include a light source and usually a light guide, for example.

Light rays 651 and 653 from the illuminator 610 are typically unpolarized, but may have some degree of prepolarization, and display apparatus 600 is typically provided with absorbing polarizers 605 and 604. Light modulating layer 606 then either transmits or blocks ray 651 in an imagewise manner, depending on whether voltage is applied or not applied to individual pixel elements. It has been found that interposing diffusely reflecting polarizer layer 603 between display 620 and viewer 1 alters the appearance of display 620 in ways which make it appear unique in comparison to other displays. It is also possible to incorporate a suitable amount of directionally varying transmission diffusivity into layer 603 to adjust the angles at which the display can be viewed, without decreasing the brightness of the display to an unacceptable level. This can be accomplished by, for example, controlling the amount of the dispersed phase, as described above.

Improved viewability of information displays is not limited to electronic displays. In a broader sense, printed matter and graphical portrayals such as signs and billboards are also information displays. Even more generally, it known that the viewing of many objects, especially those requiring detailed viewing, can be aided by use of polarized light, since light polarized in the plane of incidence of light striking the object, called p-polarized light, is likely to have a lower reflectivity, and hence a lower tendency to produce glare, than the s-polarized light, which is the light polarized perpendicular to the plane of incidence relative to the surface of the object being viewed. However, because of the losses of light inherent in producing polarized light, it is sometimes difficult to produce polarized light in an economically feasible manner in the quantities needed for viewing large displays such as signs and billboards, or for general room lighting. It has been found, however, that diffusely reflecting polarizers can be used to produce light which retains many of the benefits of polarized light while still utilizing substantially all of the original, unpolarized, light.

Figure 7A:
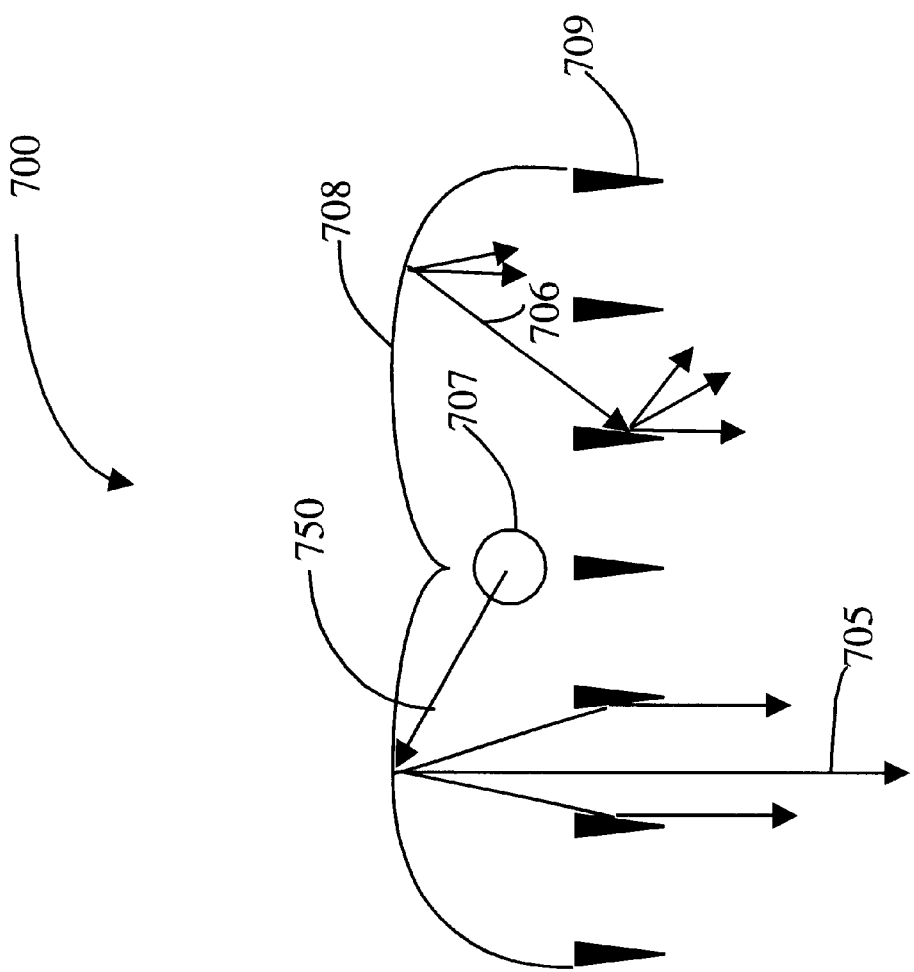
FIG. 7A illustrates an exemplary lighting system in accordance with an embodiment of the invention.
Figure 7B:
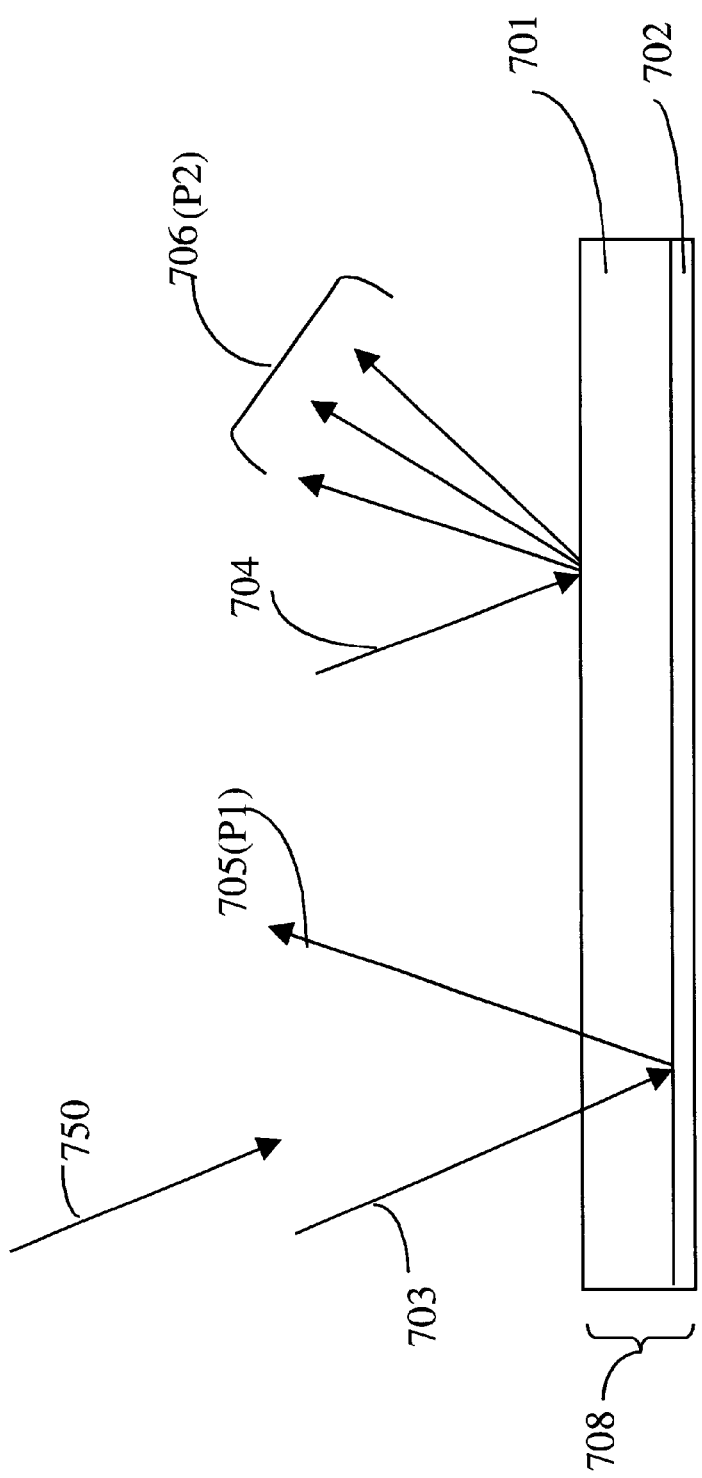
FIG. 7B illustrates an exemplary reflecting material for use in the lighting system of FIG. 7A in accordance with an embodiment of the invention.

FIGS. 7A–B illustrate a lighting apparatus in accordance with another embodiment. The exemplary lighting apparatus 700 may, for example, be an overhead lighting system used in a room, such as an office. The example lighting apparatus 700 includes a light source 707 and a reflector 708. The light source 707 typically provides unpolarized light to the reflector 708. The light source 707 may include a reflective backing and may be arranged to direct lighting substantially only in directions toward the reflector 708. The illustrated reflector 708 specularly reflects light 705 of a first polarization (P1) to provide P1 light with a first distribution and diffusely reflects light 706 of a second, different polarization (P2) to provide P2 light with a second distribution different than the first distribution. The different polarizations and distributions may be used in different manners depending on the application.

In the example embodiment, as best illustrated in FIG. 7B, the reflector 708 includes a diffusely reflecting polarizer 701 disposed closer to the light source 707 and a specular reflector 702 disposed further from the light source 707. The two components 701, 702 of the reflector 708 may, for example, be fixedly attached (e.g., by lamination). The diffusely reflecting polarizer is arranged to diffusely reflect P2 light 706 and specularly transmit P1 light 705.

In use, the light source 707 illuminates the DRP reflector 708 with light, e.g., incident ray 750. A component 703 of the light having a first polarization P2 is transmitted by the diffusely reflecting polarizer 701, specularly reflected by the specular reflector 702, and specularly retransmitted through the diffusely reflecting polarizer 701 to provide specularly reflected P1 light 705. A component 704 of the light having a second, different polarization P2 is diffusely reflected by the diffusely reflecting polarizer 701 to provide diffusely reflected light 206 having a second distribution different than the first distribution.

The reflector 708 may be disposed to curve about the light source 707 such that the specularly reflected P2 light 705 has a substantially uniform distribution and diffusely reflected P1 light has a scattered distribution. The reflector 708 may disposed around the light source 707 so that it focuses or directs light in to a concentrated area. In this case, P1 light 705 can be used to provide concentrated polarized lighting of one polarization, while diffusely reflected P2 light 706 can be used to provide general room lighting having an orthogonal polarization. In this manner, both polarizations of light from source 707 are utilized, while the benefits of polarization for lighting for a particular task requiring higher light intensity in a smaller area are retained.

In one particular embodiment, the diffusely reflected light of the first polarization is p-polarized light (vertically-polarized light) and the specularly reflected light of the second, different polarization is s-polarized light (horizontally-polarized light). When used as a ceiling light, the reflector 708 may be arranged to direct the s-polarized light toward the floor. In this manner, the s-polarized light which contributes to glare is directed to a location which minimized glare. On the other hand, the p-polarized light is scattered to provide general ambient light for the room.

The lighting apparatus may further include reflective louvers 709 arranged to specularly reflect P1 light and diffusely reflect P2 light. Each reflective louver 709 may include, on one or both sides, a DRP layer arranged to diffusely reflect P1 light and specular transmit P2 and a specular reflector disposed behind the DRP layer and arranged to specularly reflect P2 light, similar to reflector 708. The louvers 709 typically are pivotally mounted to the lighting apparatus frame to allow the direction of reflected light, and in particular the specularly reflected light, to be controlled.

Where the louvers 709 (and reflector 708 as noted above) are configured to specularly reflect s-polarized light and diffusely reflect p-polarized light, the louvers 709 may be pivoted so that the s-polarized light, which causes glare, is specularly reflected in a direction which minimizes glare, e.g., toward the floor. The p-polarized light, which contributes little to glare, is advantageously diffusely transmitted to provide, e.g., general room lighting.

The louvers 709 are typically positioned to receive light from the light source 707 via reflector 708. In the example embodiment, the light is received via a reflector 708 having a DRP layer for diffusely reflecting P2 light (e.g., p-polarized light) and a specular reflector for specularly reflecting P1 light (e.g., s-polarized light). In alternate embodiments, a reflector 708 which simply specularly reflects may be used with the louvers 709 functioning as the only diffusely reflecting and specularly reflecting element.

While a DRP/specular reflector louvers 709 and reflectors 708 are illustrated and discussed above, the invention is not so limited. Other combinations of specular and diffusely reflecting material may be used for the reflector 708 and/or louvers 709 and are intended to fall within the scope of the invention.

In one alternate embodiment, either or both of the components (i.e., the reflector 708 and/or louvers 709) includes a multilayer reflecting film disposed closer to the light source and a diffusely reflecting surface, disposed further from the light source. In use, the multilayer reflecting film specularly reflects P1 light (e.g., s-polarized light) and transmits P2 light (e.g., p-polarized light). The diffusely reflecting surface diffusely reflects P2 light, which is retransmitted by the multilayer reflecting film to provide diffusely reflected P2 light. The diffusely reflecting surface may, for example, be a textured metal surface.

In another embodiment, either or both of the components includes a multilayer reflective film, having one or two structured surfaces for diffusely reflecting P2 light (e.g., p-polarized light), and a specular reflector, disposed further from the light source, for specular reflecting P1 light (e.g., s-polarized light). The P1 light is then retransmitted by the multilayer film to provide specularly reflected P1 light.

Figure 8A:
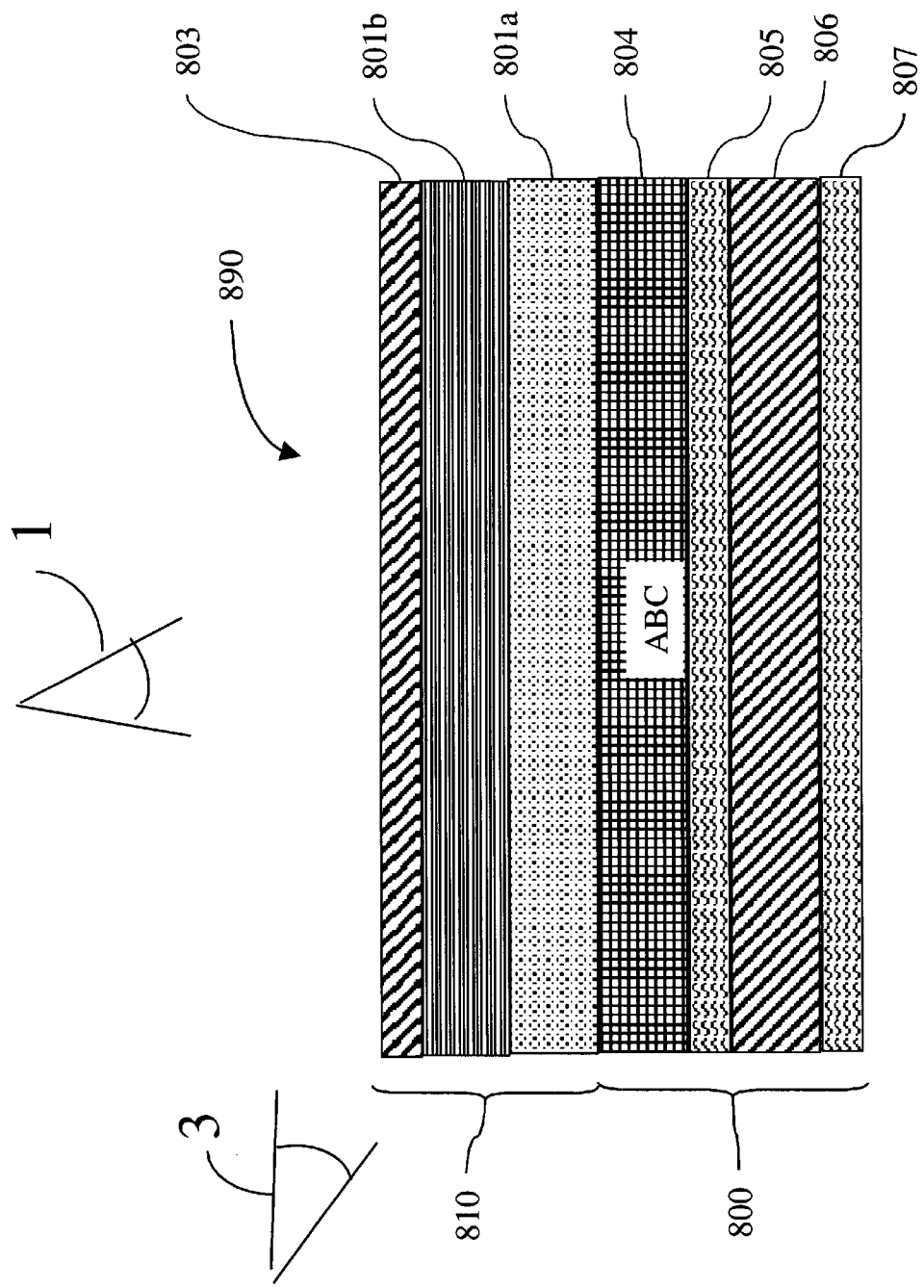
FIGS. 8A–8D illustrate exemplary security labels using diffusely reflecting polarizers in accordance with embodiments of the invention.

FIGS. 8A–8D illustrate security labels using one or more DRP layers in accordance with further embodiments of the invention. Referring now to FIG. 8A, example security label 890 comprises label portion 800 and security portion 810. Label portion 800 comprises information 715 portion 804, which might be, for example, a paper or film substrate which carries printed, graphic, or other information. Information layer 804 may be attached, by means of adhesive layer 805, to protective layer 806 for example. Protective layer 806 may be permanently attached to information layer 804, e.g., where the adhesive layer 805 is a permanent adhesive. Alternatively, adhesive layer 805 can be a pressure-sensitive adhesive, and layer 806 can be a removable adhesive liner which protects layer 805 until the label 890 is ready to be attached to a package or other substrate. In the event that protective layer 806 is a permanent protective layer, additional adhesive layer 807 can be provided to enable the label to be attached to the substrate to be labeled.

Security portion 810 of label 890 comprises a first diffusely reflecting polarizing layer 801a, aligned in a first direction, and a second diffusely reflecting polarizing layer 801b, aligned in an orthogonal direction, so as to form a pair of crossed diffusely reflective polarizers. In addition, protective layer 803 can be provided.

In use, the authenticity of label 890 can be determined by viewing the label from a first position 1, which produces a hazy view of the information carried on information layer 804, and then viewing the label at a grazing angle, as indicated by second position 3, in which case the information becomes more clear. Authentication may further be aided by incorporating into information layer 804 some small or intricate printing or other graphics which would be sensitive to the haze experienced when viewing an authentic label from position 1.

Figure 8B:
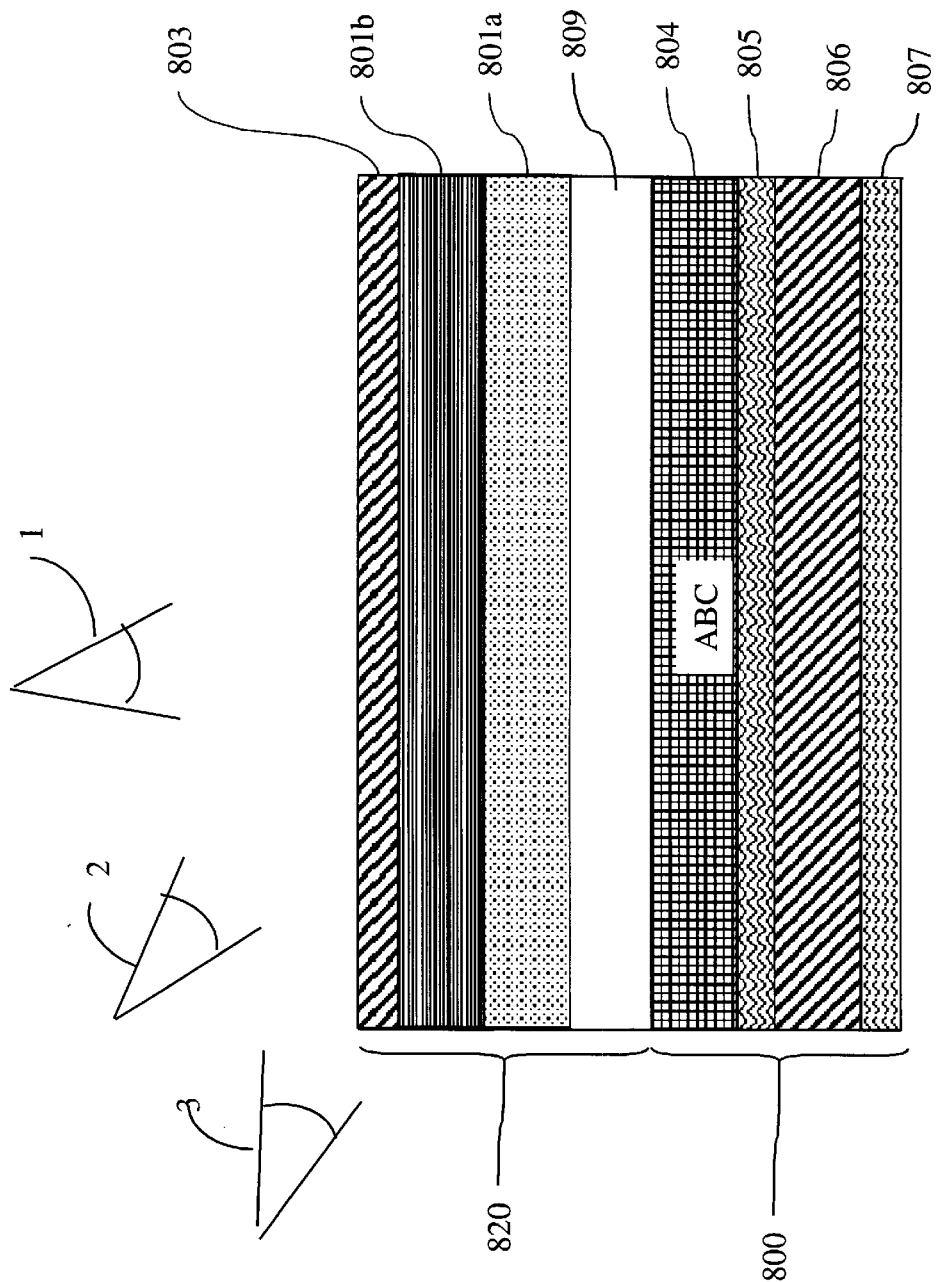

Referring to FIG. 8B, an alternative embodiment results from inserting clear spacer layer 809 between information layer 804 and first diffusely reflecting polarizer layer 801a. Preferably, layer 809 is air or other fluid material which can be excluded from between polarizing layer 801a and information layer 804 by the application of pressure to protective layer 803. Prior to application of pressure, viewing of information layer 804 from either position 1 or position 3 is blocked by security portion 820, which includes clear layer 809. With pressure applied, so that layer 809 is eliminated, the situation depicted in FIG. 8A occurs, wherein information layer 804 of an authentic label is hazy, though visible, from position 1, and clearly visible from position 3. Suitable pressure can be applied by a transparent plate, or by a suitable ring or other device containing an aperture through which information layer 804 can be viewed during the application of pressure. Suitable fluid materials for layer 809 include air or other gases, as well as clear liquids. Layers 804 and 801a can be held apart when pressure is not applied by mechanical means, such as by incorporating a slight waviness into these layers, or by fluid pressure, if layer 809 is made of a fluid which can be pressurized. It will be appreciated that providing a suitable vent or reservoir for fluid excluded from layer 809 is also useful.

Figure 8C:
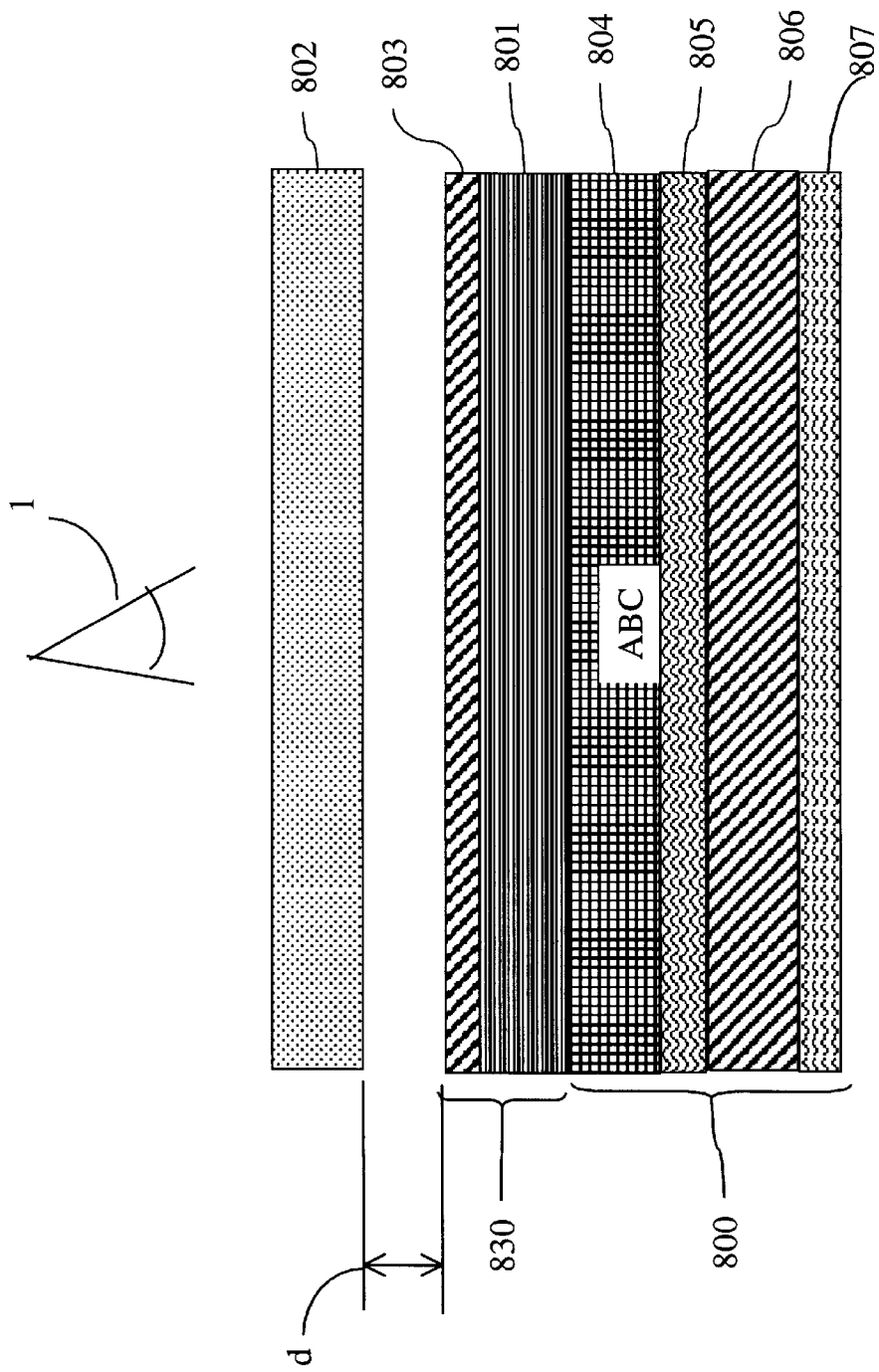

Security labels using DRPs can also be made which employ a separate viewing device, which is used with the label by the person authenticating it. Referring to FIG. 8C, viewing layer 802 can be any type of polarizing layer, such as an absorbent polarizer or other polarizing material. The distance d between viewing layer 802 and protective layer 803 is not critical, and can be any convenient distance which allows viewer 1 to read information layer 804. Since viewing layer 802 is reusable, it is not subject to the same cost constraints as a disposable layer provided with the label would be. Security layer 830 comprises diffusely reflecting polarizer layer 801 and protective layer 803. Viewer 1 views information layer 804 through viewing layer 802 and first views information layer 804 in, for example, an orientation in which the transmission axis of viewing layer 802 is orthogonal to the transmission axis of layer 801. Viewed in this manner, information layer 804 of an authentic label appears hazy. Viewing layer 802 is then rotated to an orientation in which its transmission axis is parallel to the transmission axis of layer 801, whereupon information layer 804 of an authentic label appears clear.

Figure 8D:
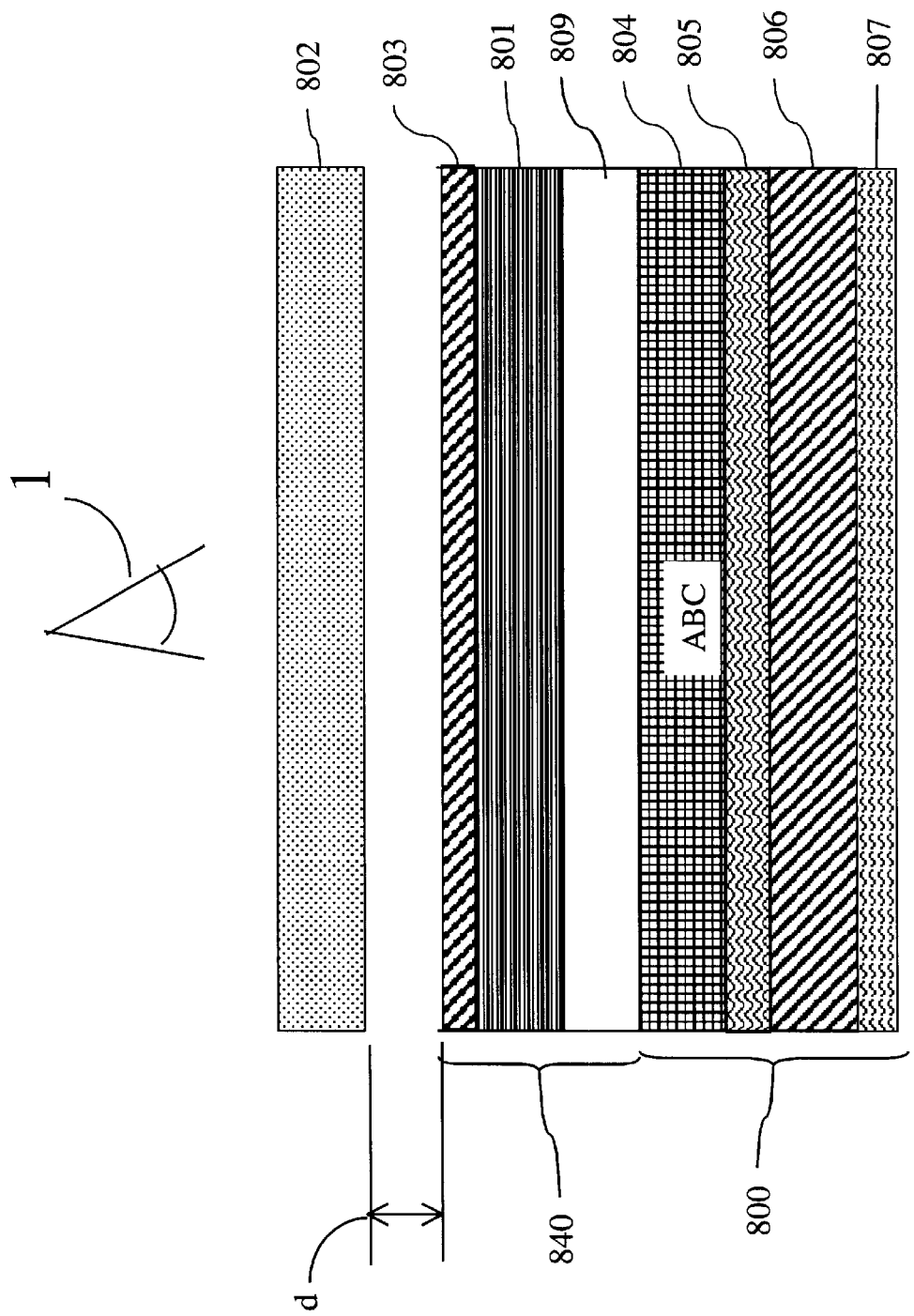

In yet another embodiment, portrayed in FIG. 8D, security portion 840 comprises clear spacer layer 809, diffusely reflecting polarizer layer 801, and protective layer 803. Viewer 1 then views information layer 804 through viewing layer 802, which is oriented, for example, with its transmission axis orthogonal to the transmission axis of layer 801. In this case the view of information layer 804 is completely blocked, rather than being merely hazy, as it was when spacer layer 809 was absent, as was the case in the previous example, portrayed in FIG. 8C. Viewing layer 802 is then rotated to an orientation in which its transmission axis is parallel to the transmission axis of layer 801, whereupon the information layer 804 appears clear, as it did in the previous example.

It will be appreciated that protective layer 803 is optional in the above embodiments, and that in some applications of the invention, layer 801 may be sufficiently durable to be used without additional protection. Other variations on the above embodiments will be readily apparent to those of ordinary skill in the art.

Electroluminescent panels are a convenient and efficient source of light for many applications, due to their compactness and light weight. Many such applications require, in addition, that the light panel produce polarized light. One example of this requirement is the liquid crystal display. There is therefore a need to efficiently produce polarized ray using such sources, without adding excessive weight or size to the system.

Figure 9:
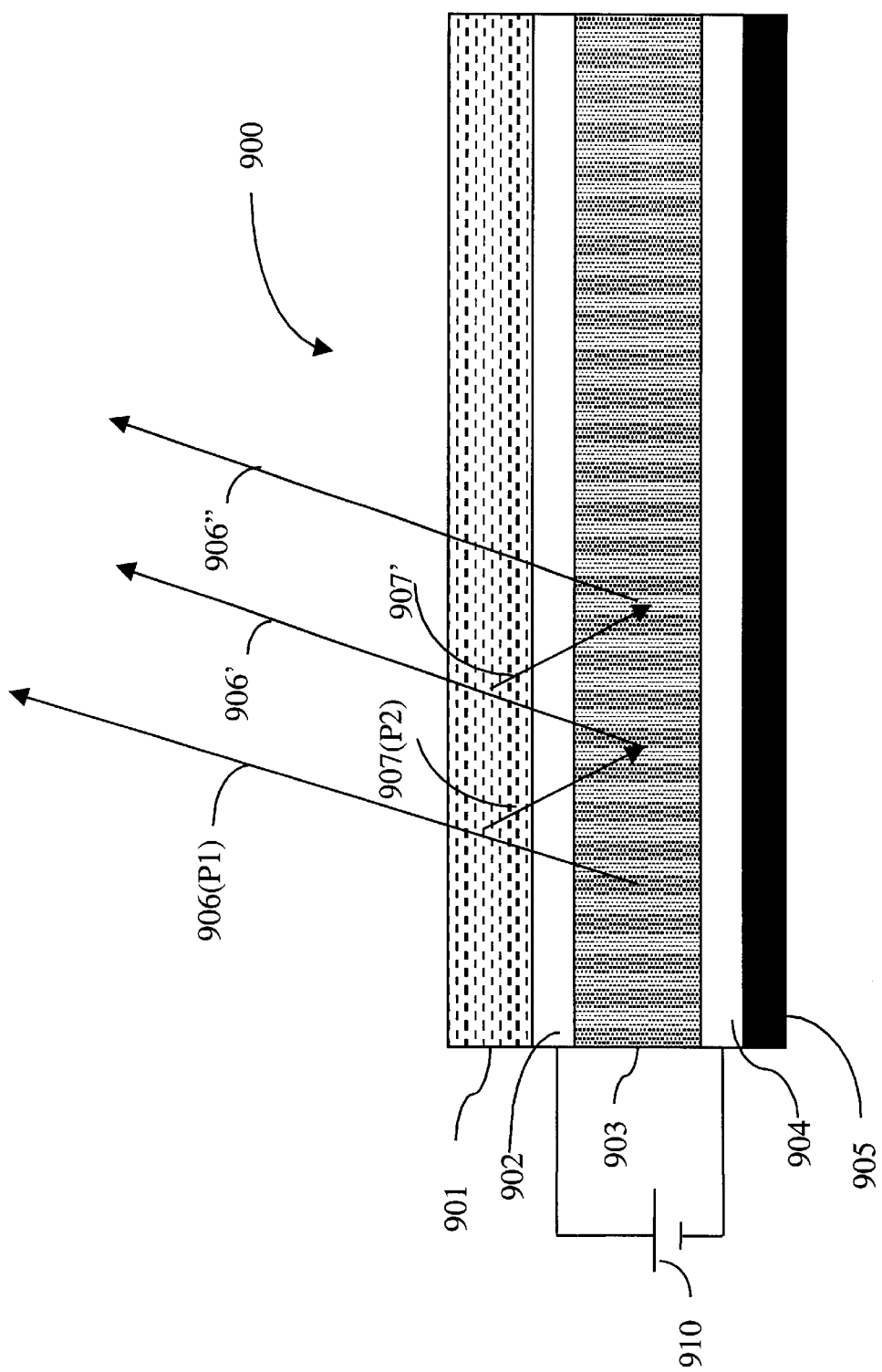
FIG. 9 illustrates an exemplary display apparatus in accordance with still another embodiment of the invention.

Referring to FIG. 9, an electroluminescent panel 900 using a diffusely reflecting polarizing layer 901 for providing polarized light is provided. In operation, a light emitting layer 903 (e.g. phosphor layer) emits light when a voltage is applied between transparent electrodes 902 and 904 by means, for example, of power source 910. Layer 903 emits light in all directions, so reflector 905 may be added to direct light in the general direction of DRP layer 901. It will be appreciated that electrode 904 could be a metallic reflective electrode, thereby obviating the need for separate reflector 905. Light emitted by emissive layer 903 is transmitted through transparent electrode 902 to diffusely reflecting polarizing layer 901, which transmits light 906, having polarization P1, and which diffusely reflects light 907 having polarization P2. Light 907 is further diffused and reflected, with changes in polarity, with portions of it eventually emerging from layer 903 as light 906', which also has polarity P1. A portion 907' is again diffusely reflected back into layer 903, where it again undergoes changes in polarization, due to diffusion, reflection, and other polarization-altering phenomena, until it eventually emerges from layer 903 and is transmitted as light 906". As a result of this recycling of light, the amount of properly polarized light emitted by electroluminescent panel 900 is increased. It may be useful, in some cases, to incorporate into layer 903, in addition to the emissive phosphor material, materials to increase the reflection and polarization-altering effects of emissive layer 903.

The DRP layer 901 and emissive layer/reflector may further be optimized to recycle light. For example, the DRP layer 901 may, for example, substantially depolarize diffusely reflected light to facilitate light recycling with an emissive layer having less depolarization characteristics. Alternatively, the angular depolarization characteristics of the two components may be set such that the emissive layer significantly depolarizes light at incident angles containing relatively large amounts of non-depolarized light and vice versa, as discussed above.

As noted above, the present invention is applicable to a number of different devices using diffusely reflecting polarizers. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art upon review of the present specification. The claims are intended to cover such modifications and devices.

What is claimed is:

1. A display apparatus, comprising:
    a light modulating layer having a first surface;
    a light cavity for providing light to the light modulating layer;
    a light guide disposed to receive the light from the light cavity and output the light at a low angle relative to the first surface of the light modulating layer;
    a turning lens disposed to receive the low angle light output from the light guide and redirect the light toward the light modulating layer;
    a diffusely reflecting polarizer disposed between the turning lens and the light modulating layer for receiving the redirected light and transmitting a component of the redirected light having a first polarization toward the light modulating layer and diffusely reflecting a component of the redirected light having a second polarization different than the first polarization;
    wherein the turning lens comprises a structured surface facing the light guide.

2. The display apparatus of claim 1 wherein the low angle is less than 20 degrees.

3. A display apparatus, comprising:
    a light modulating layer having a first surface;
    a light cavity for providing light to the light modulating layer;
    a light guide disposed to receive the light from the light cavity and output the light at a low angle relative to the first surface of the light modulating layer;
    a turning lens disposed to receive the low angle light output from the light guide and redirect the light toward the light modulating layer;
    a diffusely reflecting polarizer disposed between the turning lens and the light modulating layer for receiving the redirected light and transmitting a component of the redirected light having a first polarization toward the light modulating layer and diffusely reflecting a component of the redirected light having a second polarization different than the first polarization;
    wherein the turning lens includes a relatively planar surface facing the diffusely reflecting polarizer and a structured surface facing the light guide.

4. The display apparatus of claim 3, wherein the low angle is less than 20 degrees.

* * * * *

UNITED STATES PATENT AND TRADEMARK OFFICE
CERTIFICATE OF CORRECTION

PATENT NO.    : 6,515,785 B1
DATED         : February 4, 2003
INVENTOR(S)   : Cobb, Sanford Jr. and Wortman, David L.

It is certified that error appears in the above-identified patent and that said Letters Patent is hereby corrected as shown below:

<u>Title page,</u>
Item [57], ABSTRACT,
Line 12, delete the word "polaizer" and insert in place thereof -- polarizer --

<u>Column 4,</u>
Line 42, delete the letter "a" and insert in place thereof the symbol -- α --

<u>Column 8,</u>
Line 4, delete the word "rumination" and insert in place thereof -- lumination --

Signed and Sealed this

Ninth Day of September, 2003

JAMES E. ROGAN
*Director of the United States Patent and Trademark Office*